(12) United States Patent
Gilliam et al.

(10) Patent No.: US 7,993,500 B2
(45) Date of Patent: *Aug. 9, 2011

(54) GAS DIFFUSION ANODE AND $CO_2$ CATHODE ELECTROLYTE SYSTEM

(75) Inventors: Ryan J. Gilliam, Campbell, CA (US); Valentin Decker, Menlo Park, CA (US); Nigel Antony Knott, Campbell, CA (US); Michael Kostowskyj, Campbell, CA (US); Bryan Boggs, Campbell, CA (US); Kasra Farsad, San Jose, CA (US)

(73) Assignee: Calera Corporation, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/541,055

(22) Filed: Aug. 13, 2009

(65) Prior Publication Data

US 2010/0140103 A1 Jun. 10, 2010

Related U.S. Application Data

(63) Continuation-in-part of application No. 12/503,557, filed on Jul. 15, 2009, and a continuation-in-part of application No. PCT/US2009/048511, filed on Jun. 24, 2009, and a continuation-in-part of application No. PCT/US2009/032301, filed on Jan. 28, 2009, and a continuation-in-part of application No. PCT/US2008/088242, filed on Dec. 23, 2008.

(60) Provisional application No. 61/222,456, filed on Jul. 1, 2009, provisional application No. 61/081,299, filed on Jul. 16, 2008, provisional application No. 61/091,729, filed on Aug. 25, 2008.

(51) Int. Cl.
*C25B 9/10* (2006.01)
*C25B 1/10* (2006.01)

(52) U.S. Cl. ....................... 204/263; 205/637

(58) Field of Classification Search .................. 204/263; 205/637

See application file for complete search history.

(56) References Cited

U.S. PATENT DOCUMENTS

| | | | |
|---|---|---|---|
| 1,655,171 | A | 1/1928 | Wagner |
| 1,678,345 | A | 7/1928 | Mattison |
| 1,759,361 | A | 5/1930 | Miller |
| 1,865,833 | A | 7/1932 | Chesny |
| 1,897,725 | A | 2/1933 | Gaus et al. |
| 1,924,503 | A | 8/1933 | Lambert |
| 2,082,101 | A | 6/1937 | Dougherty |
| 2,242,294 | A | 5/1941 | Fox et al. |
| 2,304,391 | A | 12/1942 | Zimmerman |

(Continued)

FOREIGN PATENT DOCUMENTS

AU 2007100157 4/2007

(Continued)

OTHER PUBLICATIONS

"Electrochemical cell", Wikipedia (2009), http:en.wikipedia.org/wiki/Electrochemical_Cell, Nov. 24, 2009, 5 pp.

(Continued)

*Primary Examiner* — Alexa D. Neckel
*Assistant Examiner* — Nicholas A. Smith

(57) ABSTRACT

A low-voltage, low-energy electrochemical system and method of removing protons and/or producing a base solution using a gas diffusion anode and a cathode electrolyte comprising dissolved carbon dioxide, while applying 2V or less across the anode and cathode.

21 Claims, 6 Drawing Sheets

U.S. PATENT DOCUMENTS

| | | |
|---|---|---|
| 2,329,940 A | 9/1943 | Ponzer |
| 2,383,674 A | 8/1945 | Osborne |
| 2,458,039 A | 1/1949 | Wait |
| 2,606,839 A | 8/1952 | Evans |
| 2,934,419 A | 4/1960 | Cook |
| 2,967,807 A | 1/1961 | Osborne et al. |
| 3,046,152 A | 7/1962 | Tsuneyoshi |
| 3,120,426 A | 2/1964 | Crawford, Jr. |
| 3,165,460 A * | 1/1965 | Zang et al. .................... 204/634 |
| 3,179,579 A | 4/1965 | Gustave et al. |
| 3,196,092 A | 7/1965 | Beer |
| 3,202,522 A | 8/1965 | Chi-Sun Yang et al. |
| 3,262,865 A | 7/1966 | Waters, Jr. |
| 3,264,125 A | 8/1966 | Bourlin et al. |
| 3,340,003 A | 9/1967 | Judd |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,511,595 A | 5/1970 | Fuchs |
| 3,511,712 A | 5/1970 | Giner |
| 3,525,675 A | 8/1970 | Gaudin |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,686,372 A | 8/1972 | Hiatt et al. |
| 3,721,621 A | 3/1973 | Hough |
| 3,725,267 A | 4/1973 | Gelblum |
| 3,733,788 A | 5/1973 | Crowley |
| 3,847,632 A | 11/1974 | Blengsli |
| 3,861,928 A | 1/1975 | Slater et al. |
| 3,864,236 A | 2/1975 | Lindstrom |
| 3,904,496 A | 9/1975 | Harke et al. |
| 3,917,795 A | 11/1975 | Pelczarski et al. |
| 3,925,534 A | 12/1975 | Singleton et al. |
| 3,953,568 A | 4/1976 | Seko et al. |
| 3,963,592 A * | 6/1976 | Lindstrom .................... 205/512 |
| 3,970,528 A | 7/1976 | Zirngiebl et al. |
| 3,975,503 A | 8/1976 | Hauschild et al. |
| 4,000,991 A | 1/1977 | Melin, Jr. et al. |
| 4,002,721 A | 1/1977 | Guffy et al. |
| 4,026,716 A | 5/1977 | Urschel, III et al. |
| 4,036,749 A | 7/1977 | Anderson |
| 4,069,063 A | 1/1978 | Ball |
| 4,080,270 A | 3/1978 | O'Leary et al. |
| 4,106,296 A | 8/1978 | Leonard, Jr. et al. |
| 4,107,022 A | 8/1978 | Strempel et al. |
| 4,117,060 A | 9/1978 | Murray |
| 4,128,462 A | 12/1978 | Ghiringhelli et al. |
| 4,140,510 A | 2/1979 | Scholze et al. |
| 4,147,599 A | 4/1979 | O'Leary et al. |
| 4,157,250 A | 6/1979 | Regehr et al. |
| 4,164,537 A | 8/1979 | Drostholm et al. |
| 4,188,291 A | 2/1980 | Anderson |
| 4,217,186 A | 8/1980 | McRae |
| 4,219,396 A | 8/1980 | Gancy et al. |
| 4,242,185 A | 12/1980 | McRae |
| 4,246,075 A | 1/1981 | Hilbertz |
| 4,253,922 A | 3/1981 | Welch |
| 4,264,367 A | 4/1981 | Schutz |
| 4,303,549 A | 12/1981 | Boylan |
| 4,307,066 A | 12/1981 | Davidson |
| 4,308,298 A | 12/1981 | Chen |
| 4,335,788 A | 6/1982 | Murphey et al. |
| 4,337,230 A | 6/1982 | Ellestad et al. |
| 4,361,475 A | 11/1982 | Moeglich |
| 4,370,307 A | 1/1983 | Judd |
| 4,376,101 A | 3/1983 | Sartori et al. |
| 4,410,606 A | 10/1983 | Loutfy et al. |
| 4,450,009 A | 5/1984 | Childs et al. |
| 4,477,573 A | 10/1984 | Taufen |
| 4,561,945 A | 12/1985 | Coker et al. |
| 4,588,443 A | 5/1986 | Bache |
| 4,620,969 A | 11/1986 | Wilkinson |
| 4,634,533 A | 1/1987 | Somerville et al. |
| 4,716,027 A | 12/1987 | Morrison |
| 4,804,449 A | 2/1989 | Sweeney |
| 4,818,367 A | 4/1989 | Winkler |
| 4,838,941 A | 6/1989 | Hill |
| 4,852,344 A | 8/1989 | Warner |
| 4,899,544 A | 2/1990 | Boyd |
| 4,915,877 A | 4/1990 | Shepherd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,230,734 A | 7/1993 | Kumasaka et al. |
| 5,244,304 A | 9/1993 | Weill et al. |
| 5,246,551 A | 9/1993 | Pletcher et al. |
| 5,282,935 A | 2/1994 | Cawlfield et al. |
| 5,362,688 A | 11/1994 | Porta et al. |
| 5,364,611 A | 11/1994 | Iijima et al. |
| 5,366,513 A | 11/1994 | Goldmann et al. |
| 5,376,343 A | 12/1994 | Fouche |
| 5,378,279 A | 1/1995 | Conroy |
| 5,388,456 A | 2/1995 | Kettel |
| 5,470,671 A | 11/1995 | Fletcher et al. |
| 5,520,898 A | 5/1996 | Pinnavaia et al. |
| 5,531,821 A | 7/1996 | Wu |
| 5,531,865 A | 7/1996 | Cole |
| 5,536,310 A | 7/1996 | Brook et al. |
| 5,547,027 A | 8/1996 | Chan et al. |
| 5,569,558 A | 10/1996 | Takeuchi et al. |
| 5,584,923 A | 12/1996 | Wu |
| 5,584,926 A | 12/1996 | Borgholm et al. |
| 5,595,641 A | 1/1997 | Traini et al. |
| 5,614,078 A | 3/1997 | Lubin et al. |
| 5,624,493 A | 4/1997 | Wagh et al. |
| 5,690,729 A | 11/1997 | Jones, Jr. |
| 5,702,585 A | 12/1997 | Hillrichs et al. |
| 5,749,930 A | 5/1998 | Wolf et al. |
| 5,766,338 A | 6/1998 | Weber |
| 5,766,339 A | 6/1998 | Babu et al. |
| 5,776,328 A | 7/1998 | Traini et al. |
| 5,785,868 A | 7/1998 | Li et al. |
| 5,792,440 A | 8/1998 | Huege |
| 5,803,894 A | 9/1998 | Kao et al. |
| 5,846,669 A | 12/1998 | Smotkin et al. |
| 5,849,075 A | 12/1998 | Hopkins et al. |
| 5,853,686 A | 12/1998 | Doxsee |
| 5,855,666 A | 1/1999 | Kao et al. |
| 5,855,759 A | 1/1999 | Keating et al. |
| 5,885,478 A | 3/1999 | Montgomery et al. |
| 5,897,704 A | 4/1999 | Baglin |
| 5,925,255 A | 7/1999 | Mukhopadhyay |
| 5,965,201 A | 10/1999 | Jones, Jr. |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,090,197 A | 7/2000 | Vivian et al. |
| 6,129,832 A | 10/2000 | Fuhr et al. |
| 6,139,605 A | 10/2000 | Carnell et al. |
| 6,174,507 B1 | 1/2001 | Wallace et al. |
| 6,180,012 B1 | 1/2001 | Rongved |
| 6,186,426 B1 | 2/2001 | Killer |
| 6,190,428 B1 | 2/2001 | Rolison et al. |
| 6,200,381 B1 | 3/2001 | Rechichi |
| 6,200,543 B1 | 3/2001 | Allebach et al. |
| 6,217,728 B1 | 4/2001 | Lehmann et al. |
| 6,235,186 B1 | 5/2001 | Tanaka et al. |
| 6,248,166 B1 | 6/2001 | Solsvik |
| 6,251,356 B1 | 6/2001 | Mathur |
| 6,264,736 B1 | 7/2001 | Knopf et al. |
| 6,264,740 B1 | 7/2001 | McNulty, Jr. |
| 6,280,505 B1 | 8/2001 | Torkildsen et al. |
| 6,293,731 B1 | 9/2001 | Studer |
| 6,309,570 B1 | 10/2001 | Fellabaum |
| 6,352,576 B1 | 3/2002 | Spencer et al. |
| 6,375,825 B1 | 4/2002 | Mauldin et al. |
| 6,387,174 B2 | 5/2002 | Knopf et al. |
| 6,387,212 B1 | 5/2002 | Christian |
| 6,402,831 B1 | 6/2002 | Sawara et al. |
| 6,416,574 B1 | 7/2002 | Steelhammer et al. |

| | | | | | | |
|---|---|---|---|---|---|---|
| 6,444,107 B2 | 9/2002 | Hartel et al. | | 2004/0126293 A1 | 7/2004 | Geerlings et al. |
| 6,447,437 B1 | 9/2002 | Lee et al. | | 2004/0139891 A1 | 7/2004 | Merkley et al. |
| 6,475,460 B1 | 11/2002 | Max | | 2004/0213705 A1 | 10/2004 | Blencoe et al. |
| 6,495,013 B2 | 12/2002 | Mazur et al. | | 2004/0219090 A1 | 11/2004 | Dziedzic et al. |
| 6,517,631 B1 | 2/2003 | Bland | | 2004/0224214 A1 | 11/2004 | Vamos et al. |
| 6,518,217 B2 | 2/2003 | Xing et al. | | 2004/0228788 A1 | 11/2004 | Nagai et al. |
| 6,537,456 B2 | 3/2003 | Mukhopadhyay | | 2004/0231568 A1 | 11/2004 | Morioka et al. |
| 6,602,630 B1 | 8/2003 | Gopal | | 2004/0234443 A1 | 11/2004 | Chen et al. |
| 6,613,141 B2 | 9/2003 | Key, Jr. | | 2004/0259231 A1 | 12/2004 | Bhattacharya |
| 6,620,856 B1 | 9/2003 | Mortimer et al. | | 2004/0267077 A1 | 12/2004 | Ding et al. |
| 6,623,555 B1 | 9/2003 | Haverinen et al. | | 2005/0002847 A1 | 1/2005 | Maroto-Valer et al. |
| 6,638,413 B1 | 10/2003 | Weinberg et al. | | 2005/0011770 A1 | 1/2005 | Katsuyoshi et al. |
| 6,648,949 B1 | 11/2003 | Der et al. | | 2005/0031515 A1 | 2/2005 | Charette |
| 6,712,946 B2 | 3/2004 | Genders et al. | | 2005/0031522 A1 | 2/2005 | Delaney et al. |
| 6,755,905 B2 | 6/2004 | Oates et al. | | 2005/0036932 A1 | 2/2005 | Takahashi et al. |
| 6,776,972 B2 | 8/2004 | Vohra et al. | | 2005/0087496 A1 | 4/2005 | Borseth |
| 6,786,963 B2 | 9/2004 | Matherly et al. | | 2005/0098499 A1 | 5/2005 | Hussain |
| 6,841,512 B1 | 1/2005 | Fetcenko et al. | | 2005/0118081 A1 | 6/2005 | Harris et al. |
| 6,881,256 B2 | 4/2005 | Orange et al. | | 2005/0129606 A1 | 6/2005 | Mitsuhashi et al. |
| 6,890,419 B2 | 5/2005 | Reichman et al. | | 2005/0136310 A1 | 6/2005 | Luo et al. |
| 6,890,497 B2 | 5/2005 | Rau et al. | | 2005/0154669 A1 | 7/2005 | Streetman |
| 6,908,507 B2 | 6/2005 | Lalande et al. | | 2005/0180910 A1 | 8/2005 | Park et al. |
| 6,936,573 B2 | 8/2005 | Wertz et al. | | 2005/0232855 A1 | 10/2005 | Stevens et al. |
| 6,938,425 B2 | 9/2005 | Simpson et al. | | 2005/0232856 A1 | 10/2005 | Stevens et al. |
| 7,037,434 B2 | 5/2006 | Myers et al. | | 2005/0238563 A1 | 10/2005 | Eighmy et al. |
| 7,040,400 B2 | 5/2006 | de Rouffignac et al. | | 2005/0255174 A1 | 11/2005 | Shelley et al. |
| 7,132,090 B2 | 11/2006 | Dziedzic et al. | | 2006/0039853 A1 | 2/2006 | Fan et al. |
| 7,135,604 B2 | 11/2006 | Ding et al. | | 2006/0048517 A1 | 3/2006 | Fradette et al. |
| 7,198,722 B2 | 4/2007 | Hussain | | 2006/0051274 A1 | 3/2006 | Wright et al. |
| 7,255,842 B1 | 8/2007 | Yeh et al. | | 2006/0057036 A1 | 3/2006 | Ayala Hermosillo |
| 7,261,912 B2 | 8/2007 | Zeigler | | 2006/0060532 A1 | 3/2006 | Davis |
| 7,282,189 B2 | 10/2007 | Zauderer | | 2006/0093540 A1 | 5/2006 | Fan et al. |
| 7,285,166 B2 | 10/2007 | Luke et al. | | 2006/0105082 A1 | 5/2006 | Zeigler |
| 7,314,847 B1 | 1/2008 | Siriwardane | | 2006/0165583 A1 | 7/2006 | Makino et al. |
| 7,347,896 B2 | 3/2008 | Harrison | | 2006/0169177 A1 | 8/2006 | Jardine et al. |
| 7,390,444 B2 | 6/2008 | Ramme et al. | | 2006/0169593 A1* | 8/2006 | Xu et al. .................... 205/406 |
| 7,427,449 B2 | 9/2008 | Delaney et al. | | 2006/0173169 A1 | 8/2006 | Cheryan |
| 7,440,871 B2 | 10/2008 | McConnell et al. | | 2006/0184445 A1 | 8/2006 | Sandor et al. |
| 7,452,449 B2 | 11/2008 | Weinberg et al. | | 2006/0185516 A1 | 8/2006 | Moriyama et al. |
| 7,455,854 B2 | 11/2008 | Gower et al. | | 2006/0185560 A1 | 8/2006 | Ramme et al. |
| 7,541,011 B2 | 6/2009 | Hu | | 2006/0185985 A1 | 8/2006 | Jones |
| 7,595,001 B2 | 9/2009 | Arakel et al. | | 2006/0195002 A1 | 8/2006 | Grandjean et al. |
| 7,628,847 B2 | 12/2009 | Pope et al. | | 2006/0196836 A1 | 9/2006 | Arakel et al. |
| 7,674,443 B1 | 3/2010 | Davis | | 2006/0286011 A1 | 12/2006 | Anttila et al. |
| 7,704,369 B2* | 4/2010 | Olah et al. .................... 205/450 | | 2006/0288912 A1 | 12/2006 | Sun et al. |
| 7,727,374 B2 | 6/2010 | Jones | | 2007/0045125 A1 | 3/2007 | Hartvigsen et al. |
| 7,735,274 B2 | 6/2010 | Constantz et al. | | 2007/0056487 A1 | 3/2007 | Anthony et al. |
| 7,744,761 B2 | 6/2010 | Constantz et al. | | 2007/0092427 A1 | 4/2007 | Anthony et al. |
| 7,749,476 B2 | 7/2010 | Constantz et al. | | 2007/0099038 A1 | 5/2007 | Galloway |
| 7,753,618 B2 | 7/2010 | Constantz et al. | | 2007/0113500 A1 | 5/2007 | Zhao |
| 7,754,169 B2 | 7/2010 | Constantz et al. | | 2007/0148509 A1 | 6/2007 | Colbow et al. |
| 7,771,684 B2 | 8/2010 | Constantz et al. | | 2007/0163443 A1 | 7/2007 | Moriyama et al. |
| 7,790,012 B2 | 9/2010 | Kirk et al. | | 2007/0184394 A1 | 8/2007 | Comrie |
| 7,815,880 B2 | 10/2010 | Constantz et al. | | 2007/0186820 A1 | 8/2007 | O'Hearn |
| 7,829,053 B2 | 11/2010 | Constantz et al. | | 2007/0187247 A1 | 8/2007 | Lackner et al. |
| 7,875,163 B2 | 1/2011 | Gilliam et al. | | 2007/0202032 A1 | 8/2007 | Geerlings et al. |
| 7,887,694 B2 | 2/2011 | Constantz et al. | | 2007/0212584 A1 | 9/2007 | Chuang |
| 7,906,028 B2 | 3/2011 | Constantz et al. | | 2007/0217981 A1 | 9/2007 | Van Essendelft |
| 7,914,685 B2 | 3/2011 | Constantz et al. | | 2007/0233616 A1 | 10/2007 | Richards et al. |
| 2001/0022952 A1 | 9/2001 | Rau et al. | | 2007/0240570 A1 | 10/2007 | Jadhav et al. |
| 2001/0023655 A1 | 9/2001 | Knopf et al. | | 2007/0251393 A1 | 11/2007 | Pope et al. |
| 2001/0054253 A1 | 12/2001 | Takahashi et al. | | 2007/0261947 A1 | 11/2007 | Geerlings et al. |
| 2002/0009410 A1 | 1/2002 | Mathur | | 2007/0266632 A1 | 11/2007 | Tsangaris et al. |
| 2002/0127474 A1 | 9/2002 | Fleischer et al. | | 2008/0031801 A1 | 2/2008 | Lackner et al. |
| 2002/0151017 A1 | 10/2002 | Stemmer et al. | | 2008/0035036 A1 | 2/2008 | Bassani et al. |
| 2002/0155103 A1 | 10/2002 | Crippen et al. | | 2008/0059206 A1 | 3/2008 | Jenkins |
| 2003/0017088 A1 | 1/2003 | Downs et al. | | 2008/0099122 A1 | 5/2008 | Andersen et al. |
| 2003/0027023 A1 | 2/2003 | Dutil et al. | | 2008/0104858 A1 | 5/2008 | Carin et al. |
| 2003/0123930 A1 | 7/2003 | Jacobs et al. | | 2008/0112868 A1 | 5/2008 | Blencoe et al. |
| 2003/0126899 A1 | 7/2003 | Wolken | | 2008/0134891 A1 | 6/2008 | Jarvenpaa |
| 2003/0188668 A1 | 10/2003 | Bland | | 2008/0138265 A1 | 6/2008 | Lackner et al. |
| 2003/0213937 A1 | 11/2003 | Yaniv | | 2008/0171158 A1 | 7/2008 | Maddan |
| 2003/0229572 A1 | 12/2003 | Raines et al. | | 2008/0178739 A1 | 7/2008 | Lewnard et al. |
| 2004/0014845 A1 | 1/2004 | Takamura et al. | | 2008/0223727 A1 | 9/2008 | Oloman et al. |
| 2004/0028963 A1 | 2/2004 | Kormann et al. | | 2008/0233029 A1 | 9/2008 | Fan et al. |
| 2004/0040671 A1 | 3/2004 | Duesel, Jr. et al. | | 2008/0236143 A1 | 10/2008 | Lo |
| 2004/0040715 A1 | 3/2004 | Wellington et al. | | 2008/0245274 A1 | 10/2008 | Ramme |
| 2004/0052865 A1 | 3/2004 | Gower et al. | | 2008/0245660 A1 | 10/2008 | Little et al. |
| 2004/0111968 A1 | 6/2004 | Day et al. | | 2008/0245672 A1 | 10/2008 | Little et al. |

| Publication No. | Date | Inventor |
|---|---|---|
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0078162 A1 | 3/2009 | Clausi et al. |
| 2009/0081093 A1 | 3/2009 | Comrie |
| 2009/0081096 A1 | 3/2009 | Pellegrin |
| 2009/0081112 A1 | 3/2009 | Virtanen |
| 2009/0090277 A1 | 4/2009 | Joshi et al. |
| 2009/0101008 A1 | 4/2009 | Lackner et al. |
| 2009/0107038 A1 | 4/2009 | Wan |
| 2009/0120288 A1 | 5/2009 | Lackner et al. |
| 2009/0120644 A1 | 5/2009 | Roddy et al. |
| 2009/0143211 A1 | 6/2009 | Riman et al. |
| 2009/0148238 A1 | 6/2009 | Smith |
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0037653 A1 | 2/2010 | Enis et al. |
| 2010/0051859 A1 | 3/2010 | House et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0089142 A1 | 4/2010 | Sukhija et al. |
| 2010/0111810 A1 | 5/2010 | Constantz et al. |
| 2010/0116683 A1 | 5/2010 | Gilliam |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad et al. |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |

FOREIGN PATENT DOCUMENTS

| | | |
|---|---|---|
| AU | 2008256636 B2 | 12/2008 |
| CA | 1303822 C | 6/1988 |
| CA | 1335974 A1 | 6/1995 |
| CA | 2308224 C | 4/1999 |
| CA | 2255287 A1 | 6/2000 |
| CA | 2353830 A1 | 6/2000 |
| CA | 2646462 | 9/2007 |
| CA | 2617325 A1 | 11/2007 |
| CA | 2659447 A1 | 12/2008 |
| DE | 2653649 A1 | 6/1978 |
| DE | 3146326 A1 | 6/1983 |
| DE | 3638317 A1 | 1/1986 |
| DE | 19523324 A1 | 9/1994 |
| DE | 19512163 A1 | 10/1995 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| EP | 2253600 A1 | 11/2010 |
| GB | 911386 A | 11/1962 |
| GB | 1392907 | 5/1975 |
| GB | 2032441 | 5/1980 |
| GB | 2050325 A | 1/1981 |
| GB | 2208163 A | 3/1989 |
| GB | 2210035 A | 6/1989 |
| GB | 2371810 | 8/2002 |
| JP | 51102357 A1 | 9/1976 |
| JP | 59100280 | 12/1982 |
| JP | 1142093 | 11/1987 |
| JP | 63-312988 A2 | 12/1988 |
| JP | 03-020491 A2 | 1/1991 |
| JP | 03-170363 A | 7/1991 |
| JP | 7061842 A | 3/1995 |
| JP | 10287461 A | 10/1998 |
| JP | 10305212 A | 11/1998 |
| JP | 2000226402 A | 8/2000 |
| JP | 2003041388 | 7/2001 |
| JP | 2002-273163 A | 9/2002 |
| JP | 2004-174370 | 6/2004 |
| JP | 2005-052762 | 3/2005 |
| JP | 2006-076825 | 3/2006 |
| NL | 7607470 A | 1/1978 |
| WO | WO 93/16216 A1 | 8/1993 |
| WO | WO 94/18119 | 8/1994 |
| WO | WO 96/34997 A1 | 11/1996 |
| WO | WO 99/13967 A1 | 3/1999 |
| WO | WO 01/07365 A1 | 2/2001 |
| WO | WO 01/96243 A1 | 12/2001 |
| WO | WO 02/00551 A2 | 1/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/028379 A1 | 3/2005 |
| WO | WO 2005/078836 A2 | 8/2005 |
| WO | WO 2005/086843 A2 | 9/2005 |
| WO | WO 2005/108297 A2 | 11/2005 |
| WO | WO 2006/009600 A2 | 1/2006 |
| WO | WO 2006/034339 A1 | 3/2006 |
| WO | WO 2006/036396 A2 | 4/2006 |
| WO | WO 2006/099599 A2 | 9/2006 |
| WO | WO 2006/113997 A1 | 11/2006 |
| WO | WO 2006/134080 A1 | 12/2006 |
| WO | WO 2007/003013 A1 | 1/2007 |
| WO | WO 2007/016271 A2 | 2/2007 |

| | | | |
|---|---|---|---|
| WO | WO 2007/022595 A1 | 3/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/148055 A1 | 12/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A2 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 9/2010 |
| WO | WO 2010/136744 A1 | 12/2010 |
| WO | WO 2011/008223 A1 | 1/2011 |
| WO | WO 2011/017609 A1 | 2/2011 |

OTHER PUBLICATIONS

International Search Report dated Dec. 14, 2009 of PCT/US09/061748.

Allen, L.M. 1992. Boron and Sulfur Isotopic Fractionation in the Coal Combustion System. A Thesis Submitted to the Faculty of the Department of Hydrology and Water Resources. The University of Arizona.

Avery, G.B. et al. 2006. Carbon isotopic characterization of dissolved organic carbon in rainwater: Terrestrial and marine influences. *Science Direct*. 40(39): 7539-7545. Retrieved from the internet on May 20, 2010.

Baer, D.S., et al. 2002. Sensitive absorption measurements in the near-infrared region using off-axis integrated-cavity-output spectroscopy. *Appl. Phys. B.* 5 pages.

Biello, D. Cement from CO2: A Concrete Cure for Global Warming? *Scientific American* Aug. 7, 2008., pp. 1-3 [online] [retrieved on Dec. 29, 2009] <URL: http://www.scientificamerican.com/article.cfm>.

Biennier, L., et al. 2004. Multiplex integrated cavity output spectroscopy of cold PAH cations. *Chemical Physics Letters*. 387: 287-294.

Bottomley, D.J. et al. 1999. The origin and evolution of Canadian Shield brines: evaporation or freezing of seawater? New lithium isotope and geochemical evidence from the Slave craton. *Chemical Geology*. 155: 295-320.

Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.

Cerling, T.E. 1984. The stable isotopic composition of modern soil carbonate and its relationship to climate. *Earth and Planetary Science Letters*. 71: 229-240.

Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.

Criss, R.E. 1995. Stable Isotope Distribution: Variations from Temperature, Organic and Water-Rock Interactions. Washington University, St. Louis, Department of Earch and Planetary Sciences. *American Geophysical Union*. pp. 292-307.

Dickens, A. et al. 2004. Reburial of fossil organic carbon in marine sediments. *Nature*. 427: 336-339. Retrieved from the internet on May 20, 2010.

Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.

Elswick, E.R., et al. 2007. Sulfur and carbon isotope geochemistry of coal and derived coal-combustion by-products: An example from an Eastern Kentucky mine and power plant. *Applied Geochemistry*. 22: 2065-2077.

Fallick, A.E., et al. 1991. A Stable Isotope Study of the Magnesite Deposits Associated with the Alpine-Type Ultramafic Rocks of Yugoslavia. *Economic Geology*. 86: 847-861.

Faure, et al. 1963. The Isotopic Composition of Strontium in Oceanic and Continental Basalts: Application to the Origin of Igneous Rocks. *Journal of Petrology*. 4(1): 31-50. (abstract only). Http://petrology.oxfordjournals.org/cgi/content/abstract/4/1/31 (retrieved on Jun. 1, 2010).

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). *Journal of Sedimentary Research*. 70(3): 565-585.

Holdgate, G.R., et al. 2009. Eocene-Miocene carbon-isotope and floral record from brown coal seams in the Gippsland Basin of southeast Australia. *Global and Planetary Change*. 65: 89-103.

Horkel, K., et al. 2009. Stable isotopic composition of cryptocrystalline magnesite from deposits in Turkey and Austria. *Geophysical Research Abstracts*. 11. (abstract only).

Horner, G. et al. 2004. Isotope selective analysis of CO2 with tunable diode laser (TDL) spectroscopy in the NIR. *The Analyst*. 129: 772-778.

Huijgen, W.J.J., et al. 2005. Mineral CO2 Sequestration by Steel Slag Carbonation. *Environ. Sci. Technol*. 39: 9676-9682.

Huijgen, W.J.J., et al. 2006. Energy Consumption and Net CO2 Sequestration of Aqueous Mineral Carbonation. *Ind. Eng. Chem. Res*. 45: 9184-9194.

Huntzinger, D.N. et al. 2009. A life-cycle assessment of Portland cement manufacturing: comparing the traditional process with alternative technologies. *Journal of Cleaner Production*. 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.
International Search Report dated Mar. 3, 2010 of EP08867440.3.
International Search Report dated May 6, 2010 of EP09716193.9.
International Search Report dated Jun. 22, 2010 of EP08772151.0.
International Search Report dated Jan. 4, 2010 of PCT/US09/062795.
International Search Report dated Jan. 13, 2010 of PCT/US09/059135.
International Search Report dated Feb. 2, 2010 of PCT/US09/059141.
International Search Report dated Feb. 24, 2010 of PCT/US09/067764.
International Search Report dated Mar. 10, 2010 of PCT/US10/022935.
International Search Report dated May 21, 2010 of PCT/US09/064117.
"Isotopic Signature", Wikipedia (2010), http://en.wikipedia.org/wiki/Isotopic_signature, Apr. 14, 2009, 3 pp.
Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.
Mccrea, J.M. 1950. On the Isotopic Chemistry of Carbonates and a Paleotemperature Scale. *The Journal of Chemical Physics*. 18(6): 849-857.
Melezhik, V.A., et al. 2001. Palaeproterozoic magnesite: lithological and isotopic evidence for playa/sabkha environments. *Sedimentology*. 48: 379-397.
Mihalcea, R.M., et al. 1998. Diode-laser absorption measurements of CO2 near 2.0 µm at elevated temperatures. *Applied Optics*. 37(36): 8341-8347.
Miljevic, N., et al. 2007. Potential Use of Environmental Isotopes in Pollutant Migration Studies. *Environmental Isotopes in Pollutant Studies*. 58: 251-262.
Mook, W.G., et al. 1968. Isotopic Equilibrium between Shells and Their Environment. *Science*. 159(3817): 874-875.
Mook, W.G., et al. 1974. Carbon Isotope Fractionation Between Dissolved Bicarbonate and Gaseous Carbon Dioxide. 22:169-176.
Mottana, A. et al. 1979. Der grosse Mineralienfuhrer, BLV Verlagsgesel lschaft mbH, Munchen, XP002577921, p. 194. (In German with English Translation).
Noda, H., et al. 1990. Electrochemical Reduction of Carbon Dioxide at Various Metal Electrodes in Aqueous Potassium Hydrogen Carbonate Solution. *The Chemical Society of Japan*. 63: 2459-2462.
O'Neil, J.R., et al. 1971. C13 and O18 compositions in some freshwater carbonates associated with ultramafic rocks and serpentines: western United States*. *Geochimica et Cosmochimica Acta*. 35: 687-697.
Philp, R.P. 2007. The emergence of stable isotopes in environmental and forensic geochemistry studies: a review. *Environ Chem Lett*. 5:57-66.
Portier et al. 2005. Modelling CO2 solubility in pure water and NaCl-type waters from 0 to 300° C and from 1 to 300 bar Application to the Utsira Formation at Sleipner. *Chemical Geology*. 217: 187-199.
Power, I.M., et al. 2007. Biologically induced mineralization of dypingite by cyanobacteria from an alkaline wetland near Atlin, British Columbia, Canada. *Geochemical Transactions*. 8: 16 pages.
Quay, P.D., et al. 1992. Oceanic Uptake of Fossil Fuel CO$_2$: Carbon-13 Evidence. *Science*. 256 (5053): 74-79.
Saad, N. et al. 2009. Measurement of Isotopic CO2 in Dissolved Inorganic Carbons of Water Samples from Various Origins Using Wavelength-Scanned Cavity Ring-Down Spectrophotometer. *Geophysical Research Abstracts*. 11. (abstract only).
Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.

Schwab, E. 2004. Calciumhydroxid, XP-002577920. Retrieved from the Internet: <URL:http://www.roempp.com/prod/index1.html> (In German with English Translation).
Schouten, S., et al. 2004. Stable Carbon Isotopic Fractionations Associated with Inorganic Carbon Fixation by Anaerobic Ammonium-Oxidizing Bacteria. *Applied and Environmental Microbiology*. 70(6): 3785-3788.
Schroll, E. 2002. Genesis of magnesite deposits in the view of isotope geochemistry. *Boletim Paranaense de Geociencias*. 50: 59-68.
Sheppard, S.M.F., et al. 1970. Fractionation of Carbon and Oxygen Isotopes and Magnesium between Coexisting Metamorphic Calcite and Dolomite. *Contr. Mineral. and Petrol*. 26. 161-198.
Sethi, S. et al. 2006. Existing & Emerging Concentrate Minimization & Disposal Practices for Membrane Systems. *Florida Water Resources Journal*. pp. 38, 40, 42, 44, 46, 48.
Sial, A.N., et al. 2000. Carbon isotope fluctuations in Precambrian carbonate sequences of several localities in Brazil. *An. Acad. Bras. Ci*. 72(4): 539-558.
Stanley, S.M., et al. 2002. Low-magnesium calcite produced by coralline algae in seawater of Late Cretaceous composition. *PNAS*. 99(24): 15323-15326.
U.S. Appl. No. 12/126,776, filed May 23, 2008, Constantz, Brent R., et al, Non-Final Office Action dated Feb. 25, 2010; 21 pp.
U.S. Appl. No. 12/163,205, filed Jun. 27, 2008, Constantz, Brent R., et al, Non-Final Office Action dated Jan. 27, 2010.
U.S. Appl. No. 12/163,205, filed Jun. 27, 2008, Constantz, Brent R., et al, Non-Final Office Action dated Mar. 1, 2010.
U.S. Appl. No. 12/163,205, filed Jun. 27, 2008, Constantz, Brent R., et al, Non-Final Office Action dated Mar. 25, 2010.
U.S. Appl. No. 12/344,019, filed Dec. 24, 2008, Constantz, Brent R., et al, Non-Final Office Action dated Nov. 16, 2009.
U.S. Appl. No. 12/344,019, filed Dec. 24, 2008, Constantz, Brent R., et al, Non-Final Office Action dated Mar. 11, 2010.
U.S. Appl. No. 12/375,632, filed Mar. 5, 2009, Kirk, Donald W. et al, Non-Final Office Action dated Mar. 19, 2010.
U.S. Appl. No. 12/475,378, filed May 29, 2009, Constantz Brent. et al, Final Office Action dated May 5, 2010.
U.S. Appl. No. 12/475,378, filed May 29, 2009, Constantz Brent. et al, Non-Final Office Action dated Mar. 17, 2010.
U.S. Appl. No. 12/475,378, filed May 29, 2009, Constantz Brent. et al, Non-Final Office Action dated Mar. 2, 2010.
U.S. Appl. No. 12/486,692, filed Jun. 17, 2009, Constantz Brent. et al, Final Office Action dated May 3, 2010.
U.S. Appl. No. 12/486,692, filed Jun. 17, 2009, Constantz Brent. et al, Non-Final Office Action dated Mar. 23, 2010.
U.S. Appl. No. 12/486,692, filed Jun. 17, 2009, Constantz Brent. et al, Non-Final Office Action dated Mar. 1, 2010.
U.S. Appl. No. 12/501,217, filed Jul. 10, 2009, Constantz Brent. et al, Non-Final Office Action dated Mar. 12, 2010.
U.S. Appl. No. 12/557,492, filed Sep. 10, 2009, Constantz, Brent R., et al. Non-Final Office Action dated May 6, 2010.
U.S. Appl. No. 12/604,383, filed Oct. 22 2009, Constantz Brent R. et al, Non-Final Office Action dated Apr. 5, 2010.
U.S. Appl. No. 12/604,383, filed Oct. 22 2009, Constantz Brent R. et al, Final Office Action dated Jun. 11, 2010.
U.S. Appl. No. 12/571,398, filed Sep. 30, 2009, Constantz Brent R. et al, Non-Final Office Action dated May 3, 2010.
U.S. Appl. No. 12/609,491, filed Oct. 30, 2009, Constantz Brent. et al, Non-Final Office Action dated Mar. 31, 2010.
Vagin, S.P., et al. 1979. Measurement of the Temperature of Gas Media Containing Carbon Dioxide by the Laser-Probing Method. *Plenum*.
Wang, W., et al. 2005. Effects of biodegradation on the carbon isotopic composition of natural gas—A case study in the bamianhe oil field of the Jiyang Depression, Eastern China. *Geochemical Journal*. 39(4): 301-309. (abstract) [online] [retrieved on Dec. 29, 2009] <URL: http://www/jstage.jst.go.jp/article/geochemj/39/4/39_301/_article> ab.
Webber, M.E., et al. 2001. In situ combustion measurements of CO2 by use of a distributed-feedback diode-laser sensor near 2.0 µm. *Applied Optics*. 40(6): 821-828.
Wen-Zhi et al., "Using Electrolytic Method to Promote CO2 Sequestration in Serpentine by Mineral Carbonation"; Journal of China University of Mining and Technology; vol. 36, No. 6; Nov. 2007 (Publication and English Translation).

Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. *Society of Economic Geologists, Inc.* 104: 95-112.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONTO_06-88_0114.PDF>.

Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.

Aker, "Aker Clean Carbon, Carbon Capture Solutions Provider" Aker Clean Carbon Presentation for UN's IPCC; Jan. 23, 2008; 8pp.

Alexander, G. et al., "Evaluation of reaction variables in the dissolution of serpentine for mineral carbonation"; Elsevier; ScienceDirect Fuel 86 (2007) 273-281.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

"Biomass Burning: A Hot Issue in Global Change." National Aeronautics and Space Administration. Langley Research Center, Hampton, Virginia Fact Sheet FS-2001-02-56-LaRC. Feb. 2001. 4 pages.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union* Abstract #U22A-07.

Cannell, M.G.R. 2003. "Carbon sequestration and biomass energy offset: theoretical, potential and achievable capacities globally, in Europe and the UK." Biomass and Bioenergy. 24: 97-116.

CICCS "Aims and Research"; www.nottingham.ac.uk/carbonmanagement/ccs_aims.php 2pp Aug. 3, 2007.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. *Journal of Membrane Science* 284 (1-2): 323-330.

Gain, E. et al. 2002 Ammonium nitrate wastewater treatment by coupled membrane electrolysis and electrodialysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

Goldberg et al., "CO2 Mineral Sequestration Studies in US"; National Energy Technology Laboratory; goldberg@netl.doe.gov; 10pp.

Graff "Just Catch—CO2 Capture Technology" Aker Kvaerner; Pareto Clean Energy Tech Seminar Oct. 11, 2007 25pp.

Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp.

Holze, S. et al. 1994. Hydrogen Consuming Anodes for Energy Saving in Sodium Sulphate Electrolysis. *Chem. Eng. Technol.* 17: 382-389.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

International Search Report dated Feb. 19, 2009 of PCT/US08/88242.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Lackner, K. "Carbonate Chemistry for Sequestering Fossil Carbon"; Annual Review Energy Environ. 2002 27:193-232.

Levy, D. "Burnt biomass causes short-term global cooling, long-term warming." http://news-service.stanford.edu/news/2004/august4/biomass-84.html. 3 pages.

Mazrou, S., et al. 1997. Sodium hydroxide and hydrochloric acid generation from sodium chloride and rock salt by electro-electrodialysis. *Journal of Applied Electrochemistry* 27: 558-567.

Nayak, V.S. "Nonelectrolytic Production of Caustic Soda and Hydrochloric Acid from Sodium Chloride"; Ind. Eng. Chem. Res. 1996. 35: 3808-3811.

O'Connor et al., "Carbon Dioxide Sequestration By Direct Mineral Carbonation: Results From Recent Studies And Current Status"; Albany Research Center, Albany Oregon; Office of Fossil Energy, US Dept. of Energy; 1st Annual DOE Carbon Sequestration Conference, Washington DC, May 2001 12pp.

Park, A., et al. 2004. CO2 mineral sequestration: physically activated dissolution of serpentine and pH swing process. *Chemical Engineering Science* 59 (22-23): 5241-5247.

Rau, G. 2004. Possible use of Fe/CO2 fuel cells for CO2 mitigation plus H2 and electricity production. *Energy Conversion and Management*. 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html ref=todayspaper; 4pp.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Shell Global Solutions, "ADIP-X and Sulfinol-X—new regenerable acid-gas removal processes"; Shell Global Solutions International; OG 130210370903-En(A); www.shellglobalsoultions.com 2 pp.

Tececo Pty Ltd, "Eco-Cement"; www.tececo.com/simple.eco-cement.php; Dec. 29, 2008; 6pp.

Turner, J.A. 1999. "A Realizable Renewable Energy Future." Science. 285 (5428): 687-689.

Wright, L.L., et al. 1993. "U.S. Carbon Offset Potential Using Biomass Energy Systems." Water, Air, and Soil Pollution. 70: 483-497.

Back, M. et al., "Reactivity of Alkaline Lignite Fly Ashes Towards CO in Water." Environmental Science & Technology. vol. 42, No. 12 (2008) pp. 4520-4526.

Huntzinger, D.N. et al., "Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Mar. 11, 2009 of PCT/US2008/088318.
International Search Report dated Mar. 11, 2009 of PCT/2008/088246.
International Search Report dated Aug. 5, 2009 of PCT/2009/048511.
International Search Report dated Sep. 8, 2009 of PCT/US2009/045722.
International Search Report dated Sep. 17, 2009 of PCT/US2009/050756.
International Search Report dated Sep. 22, 2009 of PCT/US2009/047711.
International Search Report dated Oct. 19, 2009 of PCT/US2009/050223.
International Search Report dated Oct. 30, 2009 of PCT/US09/056573.
Justnes, H. et al. "Pozzolanic, Amorphous Silica Produced from the Mineral Olivine." Proceedings of the Seventh CANMET/ACI International Conference on Fly Ash, Silica Fume, Slag And Natural Pozzolans in Concrete, 2001. SP-199-44. pp. 769-781.
Lackner, K.S. et al. "Carbon Dioxide Disposal in Carbonate Minerals." Energy. 1995. 20(11): 1153-1170.
Montes-Hernandez, G. et al.,"Mineral sequestration of CO2 by aqueous carbonation of coal combustion fly-ash." Journal of Hazardous Materials vol. 161 (2009). pp. 1347-1354.
O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.
Rahardianto et al., "High recovery membrane desalting of low-salinity brackish water: Integration of accelerated precipitation softening with membrane RO"; Science Direct; Journal of Membrane Science 289 (2007) 123-137.
Rakib, M. et al. 1999. Behaviour of Nafion® 350 membrane in sodium sulfate electrochemical splitting: continuous process modelling and pilot scale tests. Journal of Applied Electrochemistry. 29: 1439-1448.
Sadhwani et al., "Case Studies on environmental impact of seawater desalination" Science Direct; http://www.sciencedirect.com/science?_ob=ArticleURL&_udi=B6TFX-4HMX97J-3&_u...3pp.
Uibu, M. et al. "CO2 mineral sequestration in oil-shale wastes from Estonian power production." Journal of Environmental Management vol. 90 (2009). pp. 1253-1260.
Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.
Uliasz-Bochenczyk, A. et al. "Utilization of Carbon Dioxide in Fly Ash and Water Mixtures." Chemical Engineering Research and Design. 2006. 84(A9): 843-846.
U.S. Appl. No. 12/375,632, filed Mar. 5, 2009, Kirk, Donald W. et al, Non-Final Office Action dated Sep. 8, 2009.
International Search Report dated Jul. 29, 2010 of EP08873036.1.
U.S. Appl. No. 12/521,256, filed Mar. 5, 2010, Gilliam, Ryan et al, Office Action dated Jul. 28, 2010.
Bagotsky, V.S. 2006. Conductive Polymers: Polymers with Ionic Functions. *Fundamentals of Electrochemistry*. Second Edition. New Jersey: John Wiley & Sons. pp. 454-455.
Bauer, C.F., et al. 1981. Identification and Quantitation of Carbonate Compounds in Coal Fly Ash. *American Chemical Society*. 15(7): 783-788.
Bommaraju, T.V. et al. 2001. Brine Electrolysis. <http://electrochem.cwru.edu/encycl/art-b01-brine.htm>. Retrieved on Oct. 6, 2010. pp. 1-25.
Bradfield, D.L. 1984. Conventional Uranium Processing: The Yeelirrie Uranium Project. *Practical Hydromet '83—7th Annual Symposium on Uranium and Precious Metals*. pp. 39-47. Lakewood, CO.

Eurodia. Bipolar Membrane Electrodialysis. Available online as of 2001.; visited Oct. 6, 2010 at http://www.eurodia.com/html/eb.html.
Gillery et al. Bipolar membrane electrodialysis: the time has fmally come! Presented 16th Intl. Forum on Appl. Electrochem; Cleaner Tech.-Challenges and Solutions. Nov. 10-14, 2002. Amelia Island Plantation, FL. 4 pages. Retrieved form the Internet on Aug. 14, 2009. http://www.ameridia.com/html.ebc.html.
Golden, D.C., et al. 2001. A Simple Inorganic Process for Formation of Carbonates, Magnetite, and Sulfides in Martian Meteorite ALH84001. *American Mineralogist*. 86: 370-375.
Gregerson, J. 1999. Conquering Corrosion (in concrete). *Building Design & Construction*. 40(8): 50.
Hassan, A.M. et al. 1989. Corrosion Resistant Materials For Seawater RO Plants. *Desalination*. 74: 157-170.
Hein, J.R. et al. 2006. Methanogen c calc te, $^{13}$C-depleted b valve shells, and gas hydrate from a mud volcano offshore southern Cal form a. *Geological Society of America*. 34(2): 109-112.
Horii, Y. et al. 2007. Novel evidence for natural formation of dioxins in ball clay. *Chemosphere*. 70: 1280-1289.
International Search Report dated Jan. 20, 2009 of PCT/US2007/010032.
International Search Report dated Mar. 21, 2011 of EP10739828.1.
International Search Report dated Mar. 25, 2011 of EP10739829.9.
International Search Report dated Mar. 25, 2011 of EP10737735.0.
International Search Report dated Mar. 4, 2011 of EP10737736.8.
International Search Report dated Dec. 14, 2010 of EP09812408.4.
International Search Report dated Jan. 4, 2011 of EP09818485.6.
International Search Report dated Sep. 13, 2010 of PCT/US10/035041.
Jensen, P. et al. 1992. 'Bubbling reefs' in the Kattegat: submarine landscapes of carbonate-cemented rocks support a diverse ecosystem at methane seeps. *Marine Ecology Progress Series*. 83: 103-112.
Li, et al., "Using Electrolytic Method to Promote CO2 Sequestration in Serpentine by Mineral Carbonation," Journal of China University of Mining and Technology, 36(6), pp. 817-821 (2007) (In Chinese, with English translation).
Merritt, R.C. 1971. Carbonate Leaching. The Extractive Metallurgy of Uranium: pp. 82-97. Colorado School of Mines Research Institute. Prepared Under Contract with the United States Atomic Energy Commission.
Perkins, S. 2004. Sea Change: Carbon Dioxide Imperils Marine Ecosystems. *Science News*. 166(3): 35.
Sakata, M. 1987. Movement and Neutralization of Alkaline Leachate at Coal Ash Disposal Sites. *Environ. Sci. Technol*. 21(8): 771-777.
Shaffer, R. 2008. A Devlish Green Angel. *Fast Company*. N127: 92-97.
Skrzypek, G. et al. 2006. $\delta^{13}$C analyses of calcium carbonate: comparison between the GasBench and elemental analyzer techniques. *Rapid Communications in Mass Spectrometry*. 20: 2915-2920.
Socolow, R. 1997. Fuels Decarbonization and Carbon Sequestration: Report of a Workshop. Center for Energy and Environmental Studies School of Engineering and Applied Science. Princeton University, Princeton, NJ.
Soong, Y. et al. 2004. Experimental and simulation studies on mineral trapping of CO2 with brine. *Energy Conversion and Management*. 45: 1845-1859.
Technology for Commercialization of Slag. 1995. *New Technology Japan*. ISSN: 0385-6542. p. 35.
Zhang, C.L. et al. 2001. Temperature-dependent oxygen and carbon isotope fractionations of biogenic siderite. *Geochimica et Cosmochimica Acta*. 65(14): 2257-2271.
Constantz, B. 2009. The Risk of Implementing New Regulations on Game-Changing Technology: Sequestering CO2 in the Built Environment. AGU, 90(22), Jt. Assem, Suppl., Abstract.

* cited by examiner

US 7,993,500 B2

GAS DIFFUSION ANODE AND CO$_2$ CATHODE ELECTROLYTE SYSTEM

CROSS-REFERENCE

This application is a continuation-in-part of U.S. patent application Ser. No. 12/503,557 filed on Jul. 15, 2009, titled: "CO2 Utilization In Electrochemical Systems," claiming the benefit of U.S. Provisional Patent Application No. 61/222,456, filed Jul 1, 2009, titled: "CO2 Utilization in Electrochemical Systems," which is a continuation-in-part of International Patent Application No. PCT/US09/048511, filed Jun. 24, 2009, titled: "Low-Energy 4-Cell Electrochemical System with Carbon Dioxide Gas," claiming the benefit of U.S. Provisional Patent Application No. 61/081,299, filed Jul. 16, 2008, titled: "Low Energy pH Modulation for Carbon Sequestration Using Hydrogen Absorptive Metal Catalysts" and U.S. Provisional Patent Application No. 61/091,729, filed Aug. 25, 2008, titled: "Low Energy Absorption of Hydrogen Ion from an Electrolyte Solution into a Solid Material," and which is a continuation-in-part of International Patent Application No. PCT/US08/088242, filed Dec. 23, 2008, titled: "Low Energy Electrochemical Hydroxide System and Method," and a continuation-in-part of International Patent Application No. PCT/US09/032301, filed Jan. 28, 2009, titled: "Low-Energy Electrochemical Bicarbonate Ion Solution," each of which applications is incorporated herein by reference in its entirety, and to each of which we claim priority.

BACKGROUND OF THE INVENTION

In many chemical processes a base solution is required to achieve a chemical reaction, e.g., to neutralize an acid, or buffer the pH of a solution, or precipitate an insoluble hydroxide and/or carbonate and/or bicarbonate from a solution. One method by which the base solution is produced is by an electrochemical system as disclosed in the above-referenced U.S. patent application, herein incorporated by reference in its entirety. In producing a base solution electrochemically, a large amount of energy, salt and water may be used; consequently, lowering the energy and material used is highly desired.

SUMMARY OF THE INVENTION

This invention pertains to a low-voltage, low-energy electrochemical system and method of producing a base solution, utilizing a cathode electrolyte comprising dissolved carbon dioxide gas in contact with a cathode, and a gas diffusion electrode. In one embodiment, the system comprises a gas diffusion anode and a cathode in contact with a cathode electrolyte comprising dissolved carbon dioxide. In another embodiment, the method comprises applying a voltage across a gas diffusion anode and a cathode wherein the cathode contacts a cathode electrolyte comprising dissolved carbon dioxide gas. In various embodiments, the system includes a gas delivery system configured to deliver hydrogen gas to the anode; the hydrogen gas is produced at the cathode; the anode is configured to produce protons, and the cathode is configured to produce hydrogen gas and hydroxide ions on application of a voltage across the anode and the cathode; the voltage is less than 2V; a gas is not produced at the anode; the system includes a first cation exchange membrane positioned between the cathode electrolyte and a salt solution, and an anion exchange membrane positioned between the salt solution and an anode electrolyte; the anode contacts the anode electrolyte; a second cation exchange membrane is positioned between the anode and the anode electrolyte; the system is configured to to migrate anions to the anode electrolyte from the salt solution through the anion exchange membrane when the voltage is applied across the anode and cathode; the system is configured to migrate chloride ions to the anode electrolyte from the salt solution through the anion exchange membrane; the system is configured to migrate cations to the cathode electrolyte from the salt solution through the first cation exchange membrane; the system is configured to migrate sodium ions to the cathode electrolyte from the salt solution through the first cation exchange membrane; the system is configured to migrate protons to the anode electrolyte from the anode; the system is configured to migrate hydroxide ions to the cathode electrolyte from the cathode; the system is configured to produce sodium hydroxide and/or sodium bicarbonate and/or sodium carbonate in the cathode electrolyte; the system is configured to produce an acid in the anode electrolyte; the system is configured to produce hydrochloric acid in the anode electrolyte; the system comprises a partition that partitions the cathode electrolyte into a first cathode electrolyte portion and a second cathode electrolyte portion, wherein the second cathode electrolyte portion contacts the cathode and comprises dissolved carbon dioxide; the first cathode electrolyte portion comprises gaseous carbon dioxide; in the system, the partition is positioned to isolate gaseous carbon dioxide gas in the first cathode electrolyte portion from cathode electrolyte in the second cathode electrolyte portion; the system is configured to produce hydroxide ions and hydrogen gas at the cathode; the system is configured to produce hydroxide ions in the cathode electrolyte; the system is configured to migrate cations to the cathode electrolyte through the first cation exchange membrane, migrate anions to the anode electrolyte through the anion exchange membrane; and migrate protons to the anode electrolyte from the anode; the system is configured to produce cations, hydroxide ions and/or carbonic acid and/or carbonate ions and/or bicarbonate ions in the cathode electrolyte; the system is configured to produce sodium hydroxide and/or sodium carbonate and/or sodium bicarbonate in the cathode electrolyte; the cathode electrolyte is operatively connected to a carbon dioxide gas/liquid contactor configured to dissolve carbon dioxide in the cathode electrolyte; and the cathode electrolyte is operatively connected to a system configured to is produce carbonates and/or bicarbonates and/or hydroxides from a solution comprising carbon dioxide and divalent cations.

In various embodiments, the method includes oxidizing hydrogen gas at the anode; producing protons at the anode; producing hydroxide ions and hydrogen gas at the cathode; not producing a gas at the anode; applying a voltage of 2V or less across the anode and cathode; directing hydrogen gas from the cathode to the anode; migrating protons from the anode to an anode electrolyte; interposing a cation exchange membrane between the anode and an anode electrolyte; interposing an anion exchange membrane between the anode electrolyte and a salt solution; interposing a first cation exchange membrane between the cathode electrolyte and the salt solution, and wherein the salt solution is disposed between the anion exchange membrane and the first cation exchange membrane; migrating anions from the salt solution to the anode electrolyte through the anion exchange membrane, and migrating cations from the salt solution to the cathode electrolyte through the first cation exchange membrane; producing hydroxide ions and/or carbonate ions and/or bicarbonate ions in the cathode electrolyte; and an acid in the anode electrolyte; producing sodium hydroxide and/or sodium carbonate and/or sodium bicarbonate in the cathode electrolyte; and hydrochloric acid in the anode electrolyte; contacting the cathode electrolyte with a divalent cation solution comprising calcium and/or magnesium ions; and producing partially desalinated water in the salt solution.

In the system, applying a relatively low voltage across the anode and cathode, e.g., 2V or less, produces hydroxide ions and hydrogen gas at the cathode, and protons at the anode In the system, under the applied voltage, the hydroxide ions produced at the cathode migrate into the cathode electrolyte to produce the base solution, and protons produced at the anode migrate to the anode electrolyte to produce an acid. In various embodiments, hydrogen gas produced at the cathode is directed to the anode where it is oxidized to protons. In the system, dissolving carbon dioxide in the cathode electrolyte alters the pH of the electrolyte in such a manner that the voltage required across the anode and cathode to produce the base solution is lowered. In the system, the dissolved carbon dioxide also produces carbonic acid and/or carbonate ions and/or bicarbonate ions in the cathode electrolyte, depending on the pH of the electrolyte. In various configurations, cation exchange membrane and anion exchange membranes are used in the system to separate a salt solution, e.g., a solution of sodium chloride, from the cathode electrolyte and anode electrolyte. In the system, under the applied voltage, cations in the salt solution migrate to the cathode electrolyte through the cation exchange membrane, and anions in the salt solution migrate to the anode electrolyte through an anion exchange membrane. Consequently, in the system, a base solution comprising hydroxide ions and/or dissolved carbon dioxide and/or carbonate ions and/or bicarbonate ions and/or cations from the salt solution, may be produced in the cathode electrolyte. Similarly, the anode electrolyte may produce an acid comprising protons that migrate from the anode and anions that migrate from the salt solution In the system, a gas, e.g., chlorine or oxygen is not produced at the anode.

In various embodiments, the gas diffusion anode comprises a conductive substrate infused with a catalyst that catalyzes the oxidation of hydrogen to protons. In various embodiments, the substrate is configured such that on a first side the substrate interfaces with hydrogen, and on an to opposed side the substrate interfaces with the anode electrolyte. In the system, on applying the voltages as disclosed herein across the anode and cathode, protons are produced at the substrate from oxidization of hydrogen gas. Under the applied voltages, the protons migrate to the anode electrolyte where they produce an acid.

Advantageously, with the system and method, since the voltage across the anode and cathode required to produce the hydroxide ions is lowered, the energy required to produce the base solution is lowered.

BRIEF DESCRIPTION OF THE DRAWINGS

The following drawings illustrate by way of examples and not by limitation embodiments of the present system and method.

DETAILED DESCRIPTION OF THE INVENTION

Figure 1:
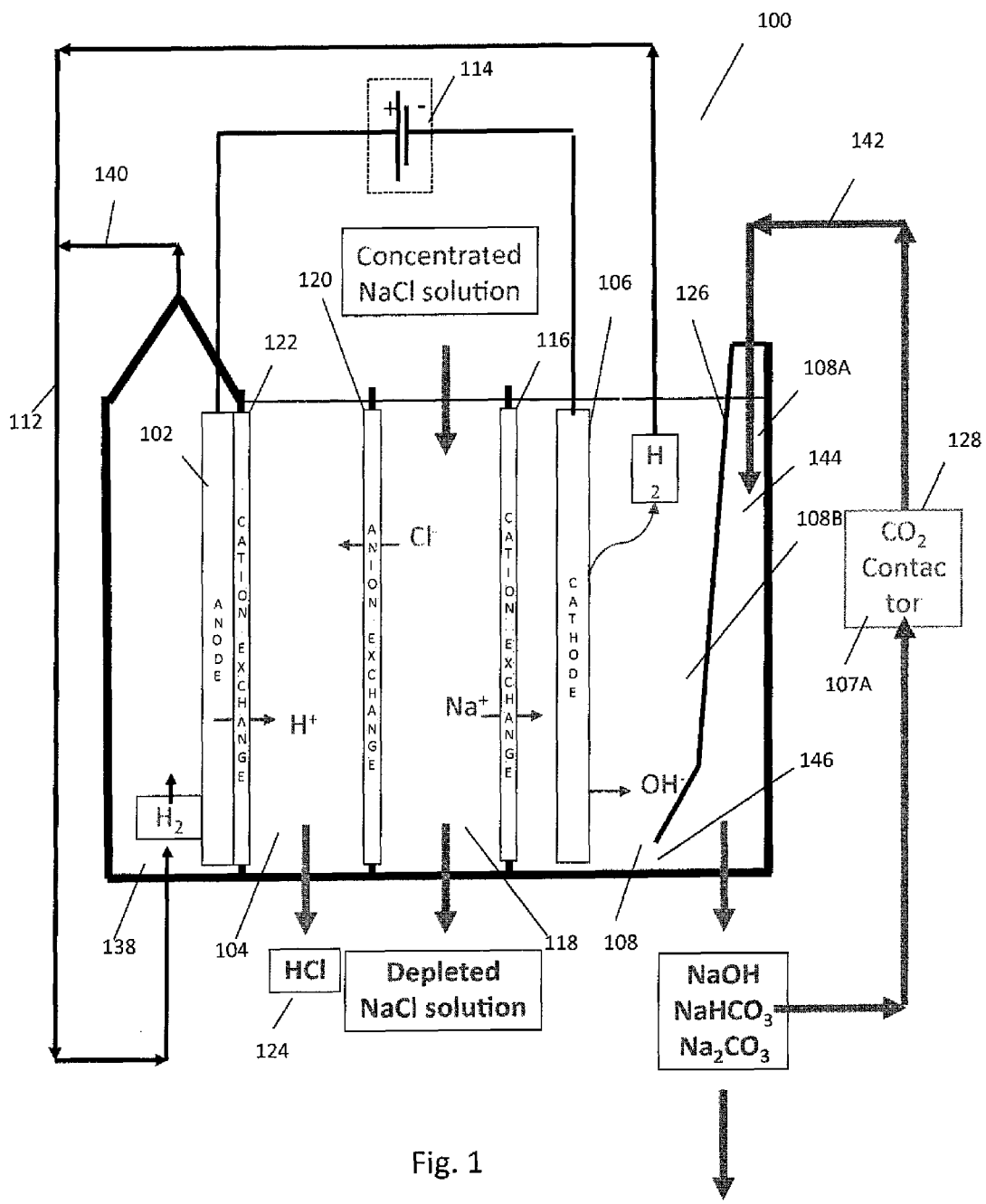
FIG. 1 is an illustration of an embodiment of the present system.

In the following detailed description, a salt solution comprising sodium chloride is utilized in the system to produce a base solution in the cathode electrolyte, and an acid in the anode electrolyte. In this exemplarary embodiment, sodium ions migrate from the salt solution to produce sodium hydroxide and/or sodium carbonate and/or sodium bicarbonate in the cathode electrolyte; and chloride ions migrate from the salt solution to produce hydrochloric acid in the anode electrolyte. However, as can be appreciated by one ordinarily skilled in the art, since the system can be configured to utilize an equivalent salt solution, e.g., a solution of potassium sulfate and the like, to produce an equivalent result, e.g., potassium hydroxide and/or potassium carbonate and/or potassium bicarbonate in the cathode electrolyte, and sulfuric acid in the anode electrolyte, the system is not limited to using sodium chloride solution but can be configured to utilize an equivalent salt solution. Therefore, to the extent that equivalent salts can be used, these equivalents are within the scope of the appended claims.

As disclosed in U.S. patent application Ser. No. 12/503,557 filed on Jul. 16, 2009, titled: "CO2 Utilization In Electrochemical Systems", herein incorporated by reference in its entirety, in various embodiments, carbon dioxide is absorbed into the cathode electrolyte utilizing a gas mixer/gas absorber. In one embodiment, the gas mixer/gas absorber comprises a series of spray nozzles that produces a flat sheet or curtain of liquid into which the gas is absorbed; in another embodiment, the gas mixer/gas absorber comprises a spray absorber that creates a mist and into which the gas is absorbed; in other embodiments, other commercially available gas/liquid absorber, e.g., an absorber available from Neumann Systems, Colorado, USA is used.

The carbon dioxide used in the system is obtained from various sources including carbon dioxide from combustion gases of fossil fuelled electrical power generating plants, cement plants, ore processing plants and the like. In some embodiments, the carbon dioxide may comprise other gases, e.g., nitrogen, oxides of nitrogen (nitrous oxide, nitric oxide), sulfur and sulfur gases (sulfur dioxide, hydrogen sulfide), and vaporized materials. In some embodiments, the system includes a gas treatment system that removes constituents in the carbon dioxide gas stream before the gas is utilized in the cathode electrolyte. In some embodiments, a portion of, or the entire amount of, cathode electrolyte comprising bicarbonate ions and/or carbonate ions/and or hydroxide ions is withdrawn from the system and is contacted with carbon dioxide gas in an exogenous carbon dioxide gas/liquid contactor to increase the absorbed carbon dioxide content in the solution. In some embodiments, the solution enriched with carbon dioxide is returned to the cathode compartment; in other embodiments, the solution enriched with carbon dioxide is reacted with a solution comprising divalent cations to produce divalent cation hydroxides, carbonates and/or bicarbonates. In some embodiments, the pH of the cathode electrolyte is adjusted upwards by hydroxide ions that migrate from the cathode, and/or downwards by dissolving carbon dioxide gas in the cathode electrolyte to produce carbonic acid and carbonic ions that react with and remove hydroxide ions. Thus it can be appreciated that the pH of the cathode electrolyte is determined, at least in part, by the balance of these two processes.

Referring to FIG. 1 herein, the system 100 in one embodiment comprises a gas diffusion anode 102 and a cathode 106 in contact with a cathode electrolyte 108, 108A, 108B comprising dissolved carbon dioxide 107A. The system in various embodiments includes a gas delivery system 112 configured to deliver hydrogen gas to the anode 102; in some embodiments, the hydrogen gas is obtained from the cathode 106. In the system, the anode 102 is configured to produce protons, and the cathode 106 is configured to produce hydroxide ions and hydrogen gas when a low voltage 114, e.g., less than 2V is applied across the anode and the cathode. In the system, a gas is not produced at the anode 102.

In the system as illustrated in FIG. 1, first cation exchange membrane 116 is positioned between the cathode electrolyte 108, 108A, 108B and a salt to solution 118, and an anion exchange membrane 120 is positioned between the salt solution 118 and the anode electrolyte 104 in a configuration where the anode electrolyte 104 is separated from the anode 102 by second cation exchange membrane 122. In the system, the second cation exchange membrane 122 is positioned between the anode 102 and the anode electrolyte 104 such that anions may migrate from the salt solution 118 to the anode electrolyte 104 through the anion exchange membrane 120; however, anions are prevented from contacting the anode 102 by the second cation exchange membrane 122 adjacent to the anode 102.

In various embodiments, the system is configurable to migrate anions, e.g., chloride ions, from the salt solution 118 to the anode electrolyte 104 through the anion exchange membrane 120; migrate cations, e.g., sodium ions from the salt solution 118 to the cathode electrolyte 108, 108A, 108B through the first cation exchange membrane 116; migrate protons from the anode 102 to the anode electrolyte 104; and migrate hydroxide ions from the cathode 106 to the cathode electrolyte 108, 108A, 108B. Thus, in various embodiments, the system can be configured to produce sodium hydroxide and/or sodium bicarbonate and/or sodium carbonate in the cathode electrolyte 108, 108A, 108B; and produce an acid e.g., hydrochloric acid 124 in the anode electrolyte.

In various embodiments as illustrated in FIG. 1, the system comprises a partition 126 that partitions the cathode electrolyte 108 into a first cathode electrolyte portion 108A and a second cathode electrolyte portion 108B, wherein the second cathode electrolyte portion 108B, comprising dissolved carbon dioxide, contacts the cathode 106, and wherein the first cathode electrolyte portion 108A comprising dissolved carbon dioxide and gaseous carbon dioxide is in contact with the second cathode electrolyte portion 108B under the partition 126 In the system, the partition is positioned in the cathode to electrolyte such that gaseous carbon dioxide in the first cathode electrolyte portion 108A is isolated from cathode electrolyte in the second cathode electrolyte portion 108B.

Thus, as can be appreciated, in various embodiments, on applying the present voltage across the anode and cathode, the system can be configured to produce hydroxide ions and hydrogen gas at the cathode 106; migrate hydroxide ions from the cathode into the cathode electrolyte 108, 108B, 108A; migrate cations from the salt solution 118 to the cathode electrolyte through the first cation exchange membrane 116; migrate chloride ions from the salt solution 118 to the anode electrolyte 104 through the anion exchange membrane 120; and migrate protons from the anode 102 to the anode electrolyte 104 Hence, depending on the salt solution 118 used, the system can be configured to produce a base solution, e.g., sodium hydroxide in the cathode electrolyte.

In some embodiments, the system is operatively connected to a carbon dioxide gas/liquid contactor 128 configured to remove cathode electrolyte from the system and dissolve carbon dioxide in the cathode electrolyte in the gas/liquid contactor before the cathode electrolyte is returned to the system.

In other embodiments, the cathode electrolyte is operatively connected to a system (not shown) that is configured to precipitate divalent cation carbonates and/or divalent cation bicarbonates and/or divalent cation hydroxides from a solution comprising carbon dioxide gas and divalent cations.

Figure 2:
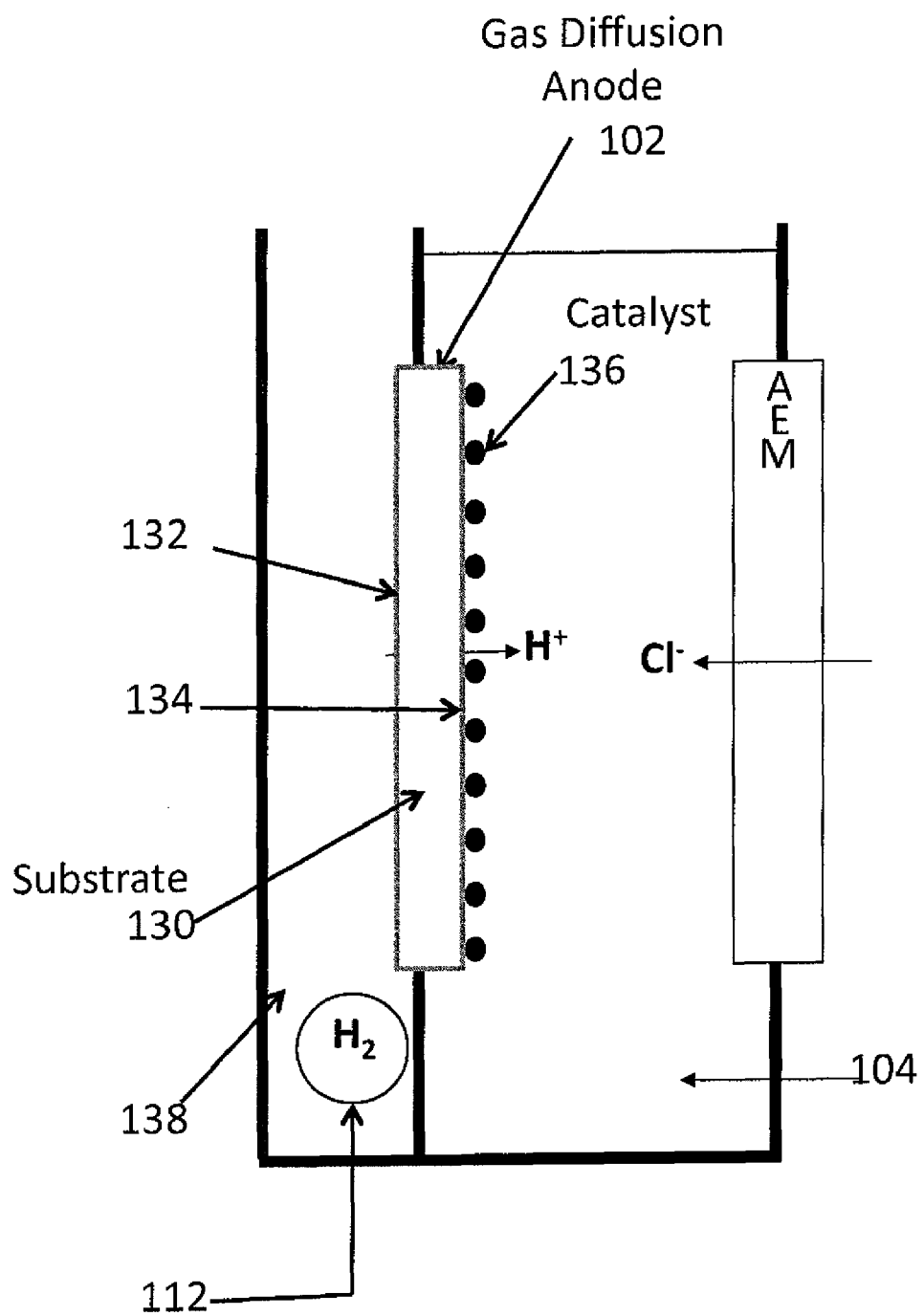
FIG. 2 is an illustration of an embodiment of the present anode system.

FIG. 2 illustrates a schematic of a suitable gas diffusion anode that can be used in the system. In various embodiments, the gas diffusion anode comprises a conductive substrate 130 infused with a catalyst 136 that is capable of catalyzing the oxidation of hydrogen gas to protons when the present voltages are applied across the anode and cathode. In some embodiments, the anode comprises a first side that interfaces with hydrogen gas provided to the anode, and an opposed second side 134 that interfaces with the anode electrolyte 104. In some embodiments, the portion of the substrate 132 that interfaces with the hydrogen gas is hydrophobic and is is relatively dry; and the portion of the substrate 134 that interfaces with the anode electrolyte 104 is hydrophilic and may be wet, which facilitates migration of protons from the anode to the anode electrolyte. Preferably, the substrate 130 may be selected such that an appropriate side is hydrophilic or hydrophobic as described herein, as well as for a low ohmic resistance for electron conduction from the anode, and good porosity for proton migration to the anode electrolyte 116. In various embodiments, the catalyst may comprise platinum, ruthenium, iridium, rhodium, manganese, silver or alloys thereof. Suitable gas diffusion anodes are available commercially, e.g., from E-TEK (USA) and other suppliers As is illustrated in FIG. 1, the system includes a salt solution 118 located between the anode electrolyte 104 and the cathode electrolyte 108, 108A, 108B. In various embodiments, the cathode electrolyte is separated from the salt solution by a first cation exchange membrane 116 that is allows migration of cations, e.g., sodium ions, from the salt solution to the cathode electrolyte The first cation exchange membrane 116 is also capable of blocking the migration of anions from the cathode electrolyte 108, 108A, 108B to the salt solution 118. In various embodiments, the anode electrolyte 104 is separated from the salt solution 118 by an anion exchange membrane 108 that will allow migration of anions, e.g., chloride ions, from the salt solution 118 to the anode electrolyte 104. The anion exchange membrane, however, will block the migration of cations, e.g., protons from the anode electrolyte 104 to the salt solution 118.

With reference to FIGS. 1 and 2, the system includes a hydrogen gas supply system 112 configured to provide hydrogen gas to the anode 102. The hydrogen may be obtained from the cathode 106 or may be obtained from external source, e.g., from a commercial hydrogen gas supplier, e.g., at start-up of the system when the hydrogen supply from the cathode is insufficient. In the system, the hydrogen gas is oxidized to protons and electrons, un-reacted hydrogen gas is recovered and circulated 140 at the anode.

Referring to FIG. 1, in operation, the cathode electrolyte 108, 108A, 108B is initially charged with a base electrolyte, e.g., sodium hydroxide solution, and the anode electrolyte 104 is initially charged with an acidic electrolyte, e.g., dilute hydrochloric acid. The cathode electrolyte is also initially charged with carbon dioxide gas 107A, 128, and hydrogen gas is provided to the anode. In the system, on applying a voltage across the anode and cathode, protons produced at the anode will enter into the anode electrolyte and attempt to migrate from the anode electrolyte 104 to the cathode 106 via the salt solution 118 between the cathode and anode. However, since the anion exchange membrane will block the migration of protons to the salt solution, the protons will accumulate in the anode electrolyte 104.

Simultaneously at the cathode 106, the voltage across the anode and cathode will produce hydroxide ions and hydrogen gas at the cathode. In some embodiments, the hydrogen produced at the cathode is recovered and directed to the anode 102 where it is oxidized to protons. In the system, hydroxide ions produced at the cathode 106 will enter into the cathode electrolyte 108, 108A, 108B from where they will attempt to migrate to the anode 102 via the salt solution 118 between the cathode and anode. However, since the cathode electrolyte 108, 108A, 108B is separated from the salt solution electrolyte by the first cation exchange membrane 116 which will block the passage of anions, the first cation exchange membrane will block the migration of hydroxide ions from the cathode electrolyte to the salt solution; consequently, the hydroxide ions will accumulate in the cathode electrolyte 108, 108A, 108B.

In the system as illustrated in FIG. 1, with the voltage across the anode and cathode, since the salt solution is separated from the cathode electrolyte by the first cation exchange membrane 116, cations in the salt solution, e.g., sodium ions, will migrate through the first cation exchange membrane 116 to the cathode electrolyte 108, 108A, 108B, and anions, e.g., chloride ions, will migrate to the anode electrolyte through the anion exchange membrane 120. Consequently, in the system, as illustrated in FIG. 1, an acid, e.g., hydrochloric acid 124 will be produced in the anode electrolyte 104, and base solution, e.g., sodium hydroxide will be produced in the cathode electrolyte. As can be appreciated, with the migration of cations and anions from the salt solution, the system in some embodiments can be configured to produce a partly de-ionized salt solution from the salt solution 118. In various embodiments, this partially de-ionized salt solution can be used as feed-water to a desalination facility (not shown) where it can be further processed to produce desalinated water as described in commonly assigned U.S. patent application Ser. No. 12/163,205 filed on Jun. 27, 2008, herein incorporated by reference in its entirety; alternatively, the solution can be used in industrial and agricultural applications where its salinity is acceptable.

With reference to FIG. 1, the system in some embodiments includes a s second cation exchange membrane 124, attached to the anode substrate 105, such that it separates the anode 102 from the anode electrolyte. In this configuration, as the second cation exchange membrane 122 is permeable to cations, protons formed at the anode will migrate to the anode electrolyte as described herein; however, as the second cation exchange membrane 122 is impermeable to anions, anions, e.g., chloride ions, in the anode electrolyte will be blocked from migrating to the anode 102, thereby avoiding interaction between the anode and the anions that may interact with the anode, e.g. by corrosion.

With reference to FIG. 1, in some embodiments, the system includes is a partition 128 configured into J-shape structure and positioned in the cathode electrolyte 108, 108A, 108B to define an upward-tapering channel 144 in the upper portion of the cathode electrolyte compartment. The partition also defines a downward-tapering channel 146 in lower portion of the cathode electrolyte. Thus, with the partition in the place, the cathode electrolyte 108 is partitioned into the first cathode electrolyte portion 108A and a second cathode electrolyte portion 108B. As is illustrated in FIG. 1, cathode electrolyte in the first cathode electrolyte portion 108A is in contact with cathode electrolyte in the second cathode electrolyte portion 108B; however, a gas in the first electrolyte portion 108A, e.g., carbon dioxide, is prevented from mixing with cathode electrolyte in the second cathode electrolyte 108B.

With reference to FIG. 1, the system in various embodiments includes a cathode electrolyte circulating system 142 adapted for withdrawing and circulating cathode electrolyte in the system. In one embodiment, the cathode electrolyte circulating system comprises a carbon dioxide gas/liquid contactor 128 that is adapted for dissolving carbon dioxide in the circulating cathode electrolyte, and for circulating the electrolyte in the system. As can be appreciated, since the pH of the cathode electrolyte can be adjusted by withdrawing and/or circulating cathode electrolyte from the system, the pH of the cathode electrolyte compartment can be by regulated by regulating an amount of cathode electrolyte removed from the system through the carbon dioxide gas/liquid contactor 128.

Figure 4:
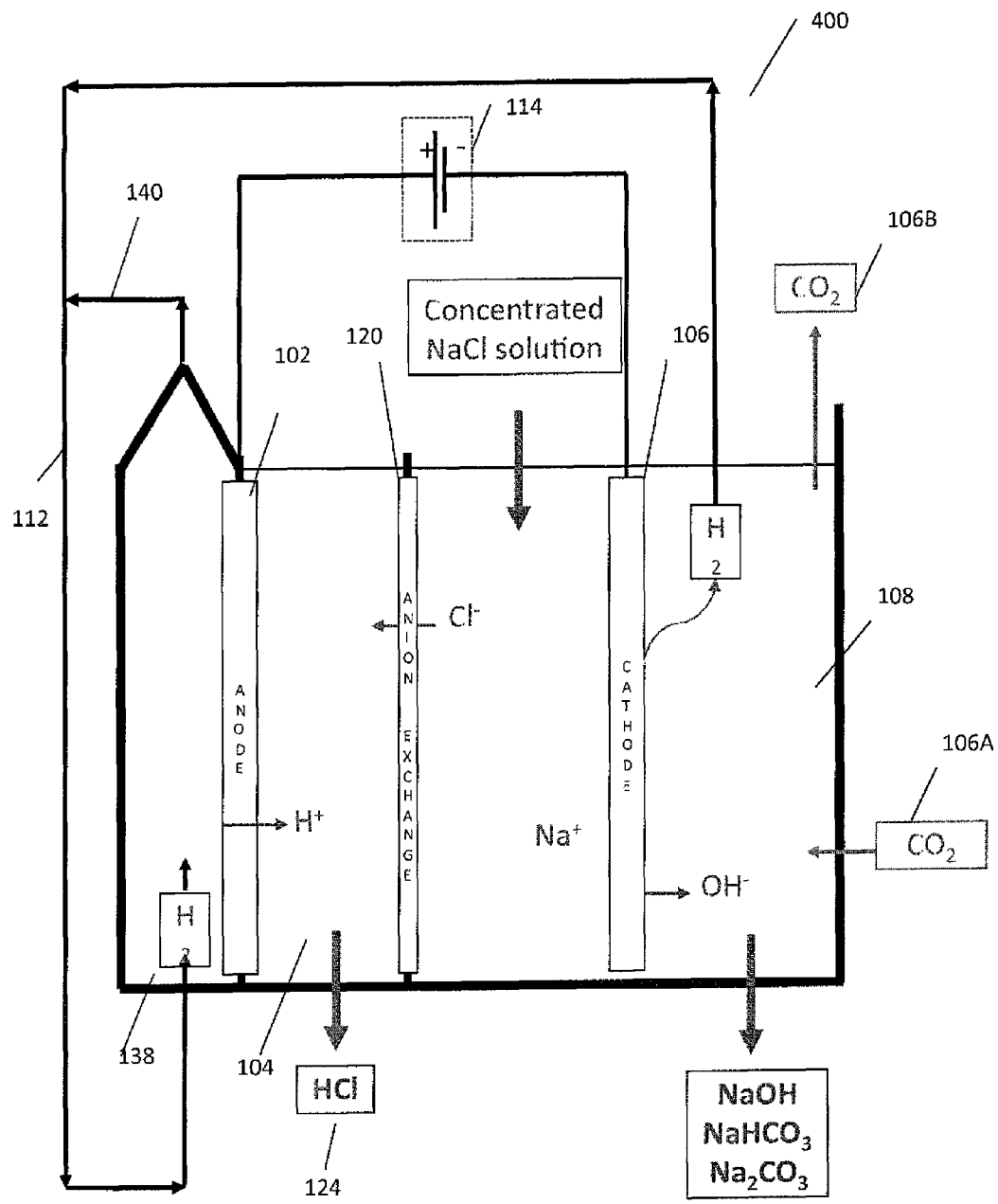
FIG. 4 is an illustration of an embodiment of the present system.

In an alternative as illustrated in FIG. 4, the system comprises a cathode 106 in contact with a cathode electrolyte 108 and an anode 102 in contact with an anode electrolyte 104. In this system, the cathode electrolyte comprises a salt solution that functions as the cathode electrolyte as well as a source of chloride and sodium ions for the base and acid solution produced in the system. In this system, the cathode electrolyte is separated from the is anode electrolyte by an anion exchange membrane 120 that allows migration of anions, e.g., chloride ions, from the salt solution to the anode electrolyte. As is illustrated in FIG. 4, the system includes a hydrogen gas delivery system 112 configured to provide hydrogen gas to the anode. The hydrogen may be obtained from the cathode and/or obtained from an external source, e.g., a commercial hydrogen gas supplier e.g., at start-up of operations when the hydrogen supply from the cathode is insufficient. In various embodiments, the hydrogen delivery system is configured to deliver gas to the anode where oxidation of the gas is catalyzed to protons and electrons. In some embodiments, unreacted hydrogen gas in the system is recovered and recirculated to the anode.

Referring to FIG. 4, as with the system of FIG. 1, on applying a voltage across the anode and cathode, protons produced at the anode from oxidation of hydrogen will enter into the anode electrolyte from where they will attempt to migrate to the cathode electrolyte across the anion exchange membrane 120. However, since the anion exchange membrane 120 will block the passage of cations, the protons will accumulate in the anode electrolyte At the same time, however, the anion exchange membrane 120 being pervious to anions will allow the migration of anions, e.g., chloride ions from the cathode electrolyte to the anode, thus in this embodiment, chloride ions will migrate to the anode electrolyte to produce hydrochloric acid in the anode electrolyte. In this system, the voltage across the anode and cathode is adjusted to a level such that hydroxide ions and hydrogen gas are produced at the cathode without producing a gas, e.g., chlorine or oxygen, at the anode. In this system, since cations will not migrate from the cathode electrolyte across the anion exchange membrane 116, sodium ions will accumulate in the cathode electrolyte 108 to produce a base solution with hydroxide ions produced at the cathode. In embodiments where carbon dioxide gas is is dissolved in the cathode electrolyte, sodium ions may also produce sodium bicarbonate and or sodium carbonate in the cathode electrolyte as described herein with reference to FIG. 1.

With reference to FIG. 1, depending on the pH of the cathode electrolyte, carbon dioxide gas introduced into the first cathode electrolyte portion 108A will dissolve in the cathode electrolyte and reversibly dissociate and equilibrate to produce carbonic acid, protons, carbonate and/or bicarbonate ions in the first cathode electrolyte compartment as follows:

$$CO_2+H_2O \Longleftrightarrow H_2CO_3 \Longleftrightarrow H^+ + HCO_3^- \Longleftrightarrow H^+ + CO_3^{2-}$$

In the system, as cathode electrolyte in the first cathode electrolyte portion 108A may mix with second cathode electrolyte portion 108B, the carbonic acid, bicarbonate and carbonate ions formed in the first cathode electrolyte portion 108A by absorption of carbon dioxide in the cathode electrolyte may migrate and equilibrate with cathode electrolyte in the second cathode electrolyte portion 108B. Thus, in various embodiments, first cathode electrolyte portion 108A may comprise dissolved and un-dissolved carbon dioxide gas, and/or carbonic acid, and/or bicarbonate ions and/or carbonate ions; while second cathode electrolyte portion 108B may comprise dissolved carbon dioxide, and/or carbonic acid, and/or bicarbonate ions and/or carbonate ions.

With reference to FIG. 1, on applying a voltage across anode 102 and cathode 108, the system 100 may produce hydroxide ions and hydrogen gas at the cathode from water, as follows:

$$2H_2O+2e^- = H_2+2OH^-$$

As cathode electrolyte in first cathode electrolyte portion 108A can intermix with cathode electolyte in second cathode electrolyte portion 108B, hydroxide ions formed in the second cathode electrolyte portion may migrate and equilibrate with carbonate and bicarbonate ions in the first cathode electrolyte is portion 108A. Thus, in various embodiments, the cathode electrolyte in the system may comprise hydroxide ions and dissolved and/or un-dissolved carbon dioxide gas, and/or carbonic acid, and/or bicarbonate ions and/or carbonate ions. In the system, as the solubility of carbon dioxide and the concentration of bicarbonate and carbonate ions in the cathode electrolyte are dependent on the pH of the electrolyte, the overall reaction in the cathode electrolyte 104 is either:

Scenario 1: $2H_2O+2CO_2+2e^- = H_2+2HCO_3^-$; or

Figure 5:
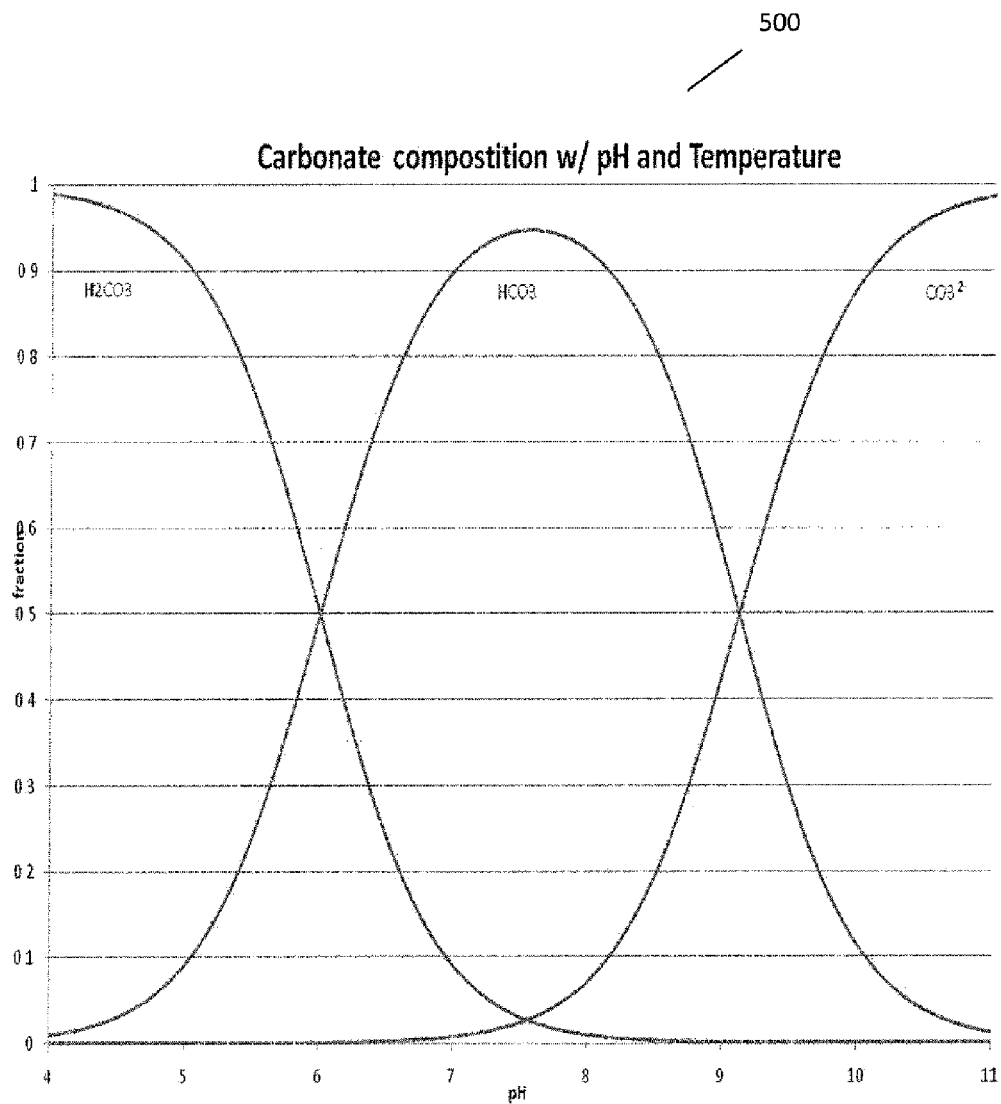
FIG. 5 is an illustration of carbonate ion/bicarbonate ion speciation in water.

Scenario 2: $H_2O+CO_2+2e^- = H_2+CO_3^{2-}$ or a combination of both, depending on the pH of the cathode electrolyte. This is illustrated in the carbonate speciation diagram of FIG. 5.

For either scenario, the overall cell potential of the system can be determined through the Gibbs energy change of the reaction by the formula:

$$E_{cell} = -\Delta G/nF$$

Figure 6:
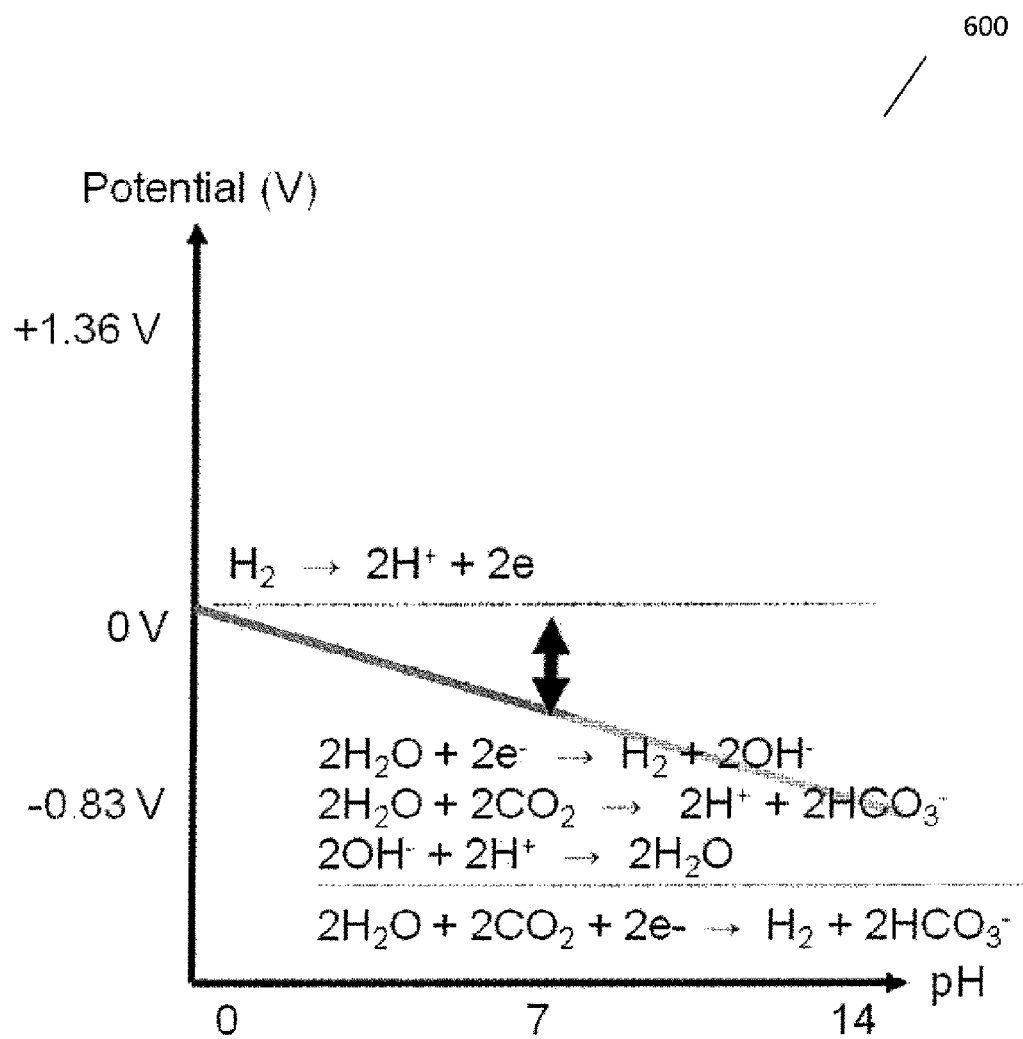
FIG. 6 is an illustration of bicarbonate ion generation in the cathode electrolyte.

Or, at standard temperature and pressure conditions:

$$E°_{cell} = -\Delta G°/nF$$

where, $E_{cell}$ is the cell voltage, $\Delta G$ is the Gibbs energy of reaction, n is the number of electrons transferred, and F is the Faraday constant (96485 J/Vmol). The $E_{cell}$ of each of these reactions is pH dependent based on the Nernst equestion as demonstrated in FIG. 6 for Scenario 1, and as discussed below.

Also, for either scenario, the overall cell potential can be determined through the combination of Nernst equations for each half cell reaction:

$$E = E° - RT \ln(Q)/nF$$

where, E° is the standard reduction potential, R is the universal gas constant, (8.314 J/mol K) T is the absolute temperature, n is the number of electrons involved in the half cell reaction, F is Faraday's constant (96485 J/V mol), and Q is the reaction quotient such that:

$$E_{total} = E_{cathode} + E_{anode}.$$

When hydrogen is oxidized to protons at the anode as follows:

$$H_2 = 2H^+ + 2e^-,$$

E° is 0.00 V, n is 2, and Q is the square of the activity of $H^+$ so that:

$$E_{anode} = +0.059 \, pH_a,$$

where $pH_a$ is the pH of the anode electrolyte.

When water is reduced to hydroxide ions and hydrogen gas at the cathode as follows:

$$2H_2O+2e^- = H_2+2OH^-,$$

E° is −0.83 V, n is 2, and Q is the square of the activity of $OH^-$ so that:

$$E_{cathode} = -0.059 \, pH_c,$$

where $pH_c$ is the pH of the cathode electrolyte.

For either Scenario, the E for the cathode and anode reactions varies with the pH of the anode and cathode electrolytes. Thus, for Scenario 1 if the anode reaction, which is occurring in an acidic environment, is at a pH of 0, then the E of the reaction is 0V for the half cell reaction. For the cathode reaction, if the generation of bicarbonate ions occur at a pH of 7, then the theoretical E is 7×(−0.059V)=−0.413V for the half cell reaction where a negative E means energy is needed to be input into the half cell or full cell for the reaction to proceed. Thus, if the anode pH is 0 and the cathode pH is 7 then the overall cell potential would be −0.413V, where:

$$E_{total} = -0.059 \, (pH_a - pH_c) = -0.059 \, \Delta pH.$$

For Scenario 2 in which carbonate ions are produced, if the anode pH is 0 and the cathode pH is 10, this would represent an E of 0.59 V.

Thus, in various embodiments, directing $CO_2$ gas into the cathode electrolyte may lower the pH of the cathode electrolyte by producing bicarbonate ions and/or carbonate ions in the cathode electrolyte, which consequently may lower the voltage across the anode and cathode in producing hydroxide, carbonate and/or bicarbonate in the cathode electrolyte.

Thus, as can be appreciated, if the cathode electrolyte is allowed to increase to a pH of 14 or greater, the difference between the anode half-cell potential (represented as the thin dashed horizontal line, Scenario 1, above) and the cathode half cell potential (represented as the thick solid sloping line in Scenario 1, above) will increase to 0.83V. With increased duration of cell operation without $CO_2$ addition or other intervention, e.g., diluting with water, the required cell potential will continue to increase. The cell potential may also increase due to ohmic resistance loses across the membranes in the electrolyte and the cell's overvoltage potential.

Herein, an overvoltage potential refers to the voltage difference between a thermodynamically determined half-cell reduction potential, and the experimentally observed potential at which the redox reaction occurs. The term is related to a cell voltage efficiency as the overvoltage potential requires more energy than is thermodynamically required to drive a reaction. In each case, the extra energy is lost as heat. Overvoltage potential is specific to each cell design and will vary between cells and operational conditions even for the same reaction.

In embodiments wherein it is desired to produce bicarbonate and/or carbonate ions in the cathode electrolyte, the system as illustrated in FIGS. 1-2, and as described above with reference to production of hydroxide ions in the cathode electrolyte, can be configured to produce bicarbonate ions and/or carbonate ions in the first cathode electrolyte by dissolving carbon dioxide in the first cathode electrolyte and applying a voltage of less than 3V, or less than 2.5 V, or less than 2V, or less than 1.5V such as less than 1.0V, or even less than 0.8 V or 0.6V across the cathode and anode.

In various embodiments, hydroxide ions, carbonate ions and/or bicarbonate ions produced in the cathode electrolyte, and hydrochloric acid produced in the anode electrolyte are removed from the system, while sodium chloride in the salt solution electrolyte is replenished to maintain continuous operation of the system. As can be appreciated, in various embodiments, the system can be configured to operate in various production modes including batch mode, semi-batch mode, continuous flow mode, with or without the option to withdraw portions of the hydroxide solution produced in the cathode electrolyte, or withdraw all or a portions of the acid produced in the anode electrolyte, or direct the hydrogen gas produced at the cathode to the anode where it may be oxidized.

In various embodiments, hydroxide ions, bicarbonate ions and/or carbonate ion solutions are produced in the cathode electrolyte when the voltage applied across the anode and cathode is less than 3V, 2.9V or less, 2.8V or less, 2.7V or less, 2.6V or less, 2.5V or less, 2.4V or less, 2.3V or less, 2.2V or less, 2.1V or less, 2.0V or less, 1.9V or less, 1.8V or less, 1.7V or less, 1.6V, or less 1.5V or less, 1.4V or less, 1.3V or less, 1.2V or less, 1.1V or less, 1.0V or less, 0.9V or less or less, 0.8V or less, 0.7V or less, 0.6V or less, 0.5V or less, 0.4V or less, 0.3V or less, 0.2V or less, or 0.1 V or less.

In another embodiment, the voltage across the anode and cathode can be adjusted such that gas will form at the anode, e.g., oxygen or chlorine, while hydroxide ions, carbonate ions and bicarbonate ions are produced in the cathode electrolyte and hydrogen gas is generated at the cathode. However, in this embodiment, hydrogen gas is not supplied to the anode. As can be appreciated by one ordinarily skilled in the art, in this embodiment, the voltage across the anode and cathode will be higher compared to the embodiment when a gas does not form at the anode.

With reference to FIGS. 1-2, in various embodiments, the invention provides for a system comprising one or more anion exchange membrane 120, and cation exchange membranes 116, 122 located between the gas diffusion anode 102 and the cathode 106. In various embodiments, the membranes should be selected such that they can function in an acidic and/or basic electrolytic solution as appropriate. Other desirable characteristics of the membranes include high ion selectivity, low ionic resistance, high burst strength, and high stability in an acidic electrolytic solution in a temperature range of 0° C. to 100° C. or higher, or a base solution in similar temperature range may be used. In some embodiments, a membrane that is stable in the range of 0° C. to 80° C., or 0° C. to 90° C., but not stable above these ranges may be used. For other embodiments, it may be useful to utilize an ion-specific ion exchange membranes that allows migration of one type of cation but not another; or migration of one type of anion and not another, to achieve a desired product or products in an electrolyte. In some embodiments, the membrane should be stable and functional for a desirable length of time in the system, e.g., several days, weeks or months or years at temperatures in the range of 0° C. to 80° C., or 0° C. to 90° C. and higher and/or lower. In some embodiments, for example, the membranes should be stable and functional for at least 5 days, 10 days, 15 days, 20 days, 100 days, 1000 days or more in electrolyte temperatures at 80° C., 70° C., 60° C., 50° C., 40° C., 30° C., 20° C., 10° C., 5° C. and more or less.

As can be appreciated, the ohmic resistance of the membranes will affect the voltage drop across the anode and cathode, e.g., as the ohmic resistance of the membranes increase, the voltage drop across the anode and cathode will increase, and vice versa. Membranes currently available can be used and they include membranes with relatively ohmic resistance and relatively high ionic mobility, similarly, membranes currently available with relatively high hydration characteristics that increases with temperatures, and thus decreasing the ohmic resistance can be used. Consequently, as can be appreciated, by selecting currently available membranes with lower ohmic resistance, the voltage drop across the anode and cathode at a specified temperature can be lowered.

Scattered through currently available membrane are ionic channels consisting of acid groups. These ionic channels may extend from the internal surface of the matrix to the external surface and the acid groups may readily bind water in a reversible reaction as water-of-hydration. This binding of water as water-of-hydration follows first order reaction kinetics, such that the rate of reaction is proportional to temperature. Consequently, currently available membranes can be selected to provide a relatively low ohmic and ionic resistance while providing for improved strength and resistance in the system for a range of operating temperatures. Suitable membranes are commercially available from Asahi Kasei of Tokyo, Japan; or from Membrane International of Glen Rock, N.J., and USA.

In various embodiments, the cathode electrolyte 108, 108A, 108B is operatively connected to a waste gas treatment system (not illustrated) where the base solution produced in the cathode electrolyte is utilized, e.g., to sequester carbon dioxide contained in the waste gas by contacting the waste gas and the cathode electrolyte with a solution of divalent cations to precipitate hydroxides, carbonates and/or bicarbonates as described in commonly assigned U.S. patent application Ser. No. 12/344,019 filed on Dec. 24, 2008, herein incorporated by reference in its entirety. The precipitates, comprising, e.g., calcium and magnesium hydroxides, carbonates and bicarbonates in various embodiments may be utilized as building materials, e.g., as cements and aggregates, as described in commonly to assigned U.S. patent application Ser. No. 12/126,776 filed on May 23, 2008, supra, herein incorporated by reference in its entirety. In some embodiments, some or all of the carbonates and/or bicarbonates are allowed to remain in an aqueous medium, e.g., a slurry or a suspension, and are disposed of in an aqueous medium, e.g., in the ocean depths or a subterranean site.

In various embodiments, the cathode and anode are also operatively connected to an off-peak electrical power-supply system 114 that supplies off-peak voltage to the electrodes. Since the cost of off-peak power is lower than the cost of power supplied during peak power-supply times, the system can utilize off-peak power to produce a base solution in the cathode electrolyte at a relatively lower cost.

In another embodiment, the system produces an acid, e g., hydrochloric acid 124 in the anode electrolyte 104. In various embodiments, the anode compartment is operably connected to a system for dissolving minerals and/or waste materials comprising divalent cations to produce a solution of divalent cations, e.g., $Ca^{++}$ and $Mg^{++}$. In various embodiments, the divalent cation solution is utilized to precipitate hydroxides, carbonates and/or bicarbonates by contacting the divalent cation solution with the present base solution and a source of carbon dioxide gas as described in U.S. patent application Ser. No. 12/344,019 filed on Dec. 24, 2008, supra, herein incorporated by reference in its entirety. In various embodiments, the precipitates are used as building materials e.g., cement and aggregates as described in commonly assigned U.S. patent application Ser. No. 12/126,776, supra, herein incorporated by reference in its entirety.

With reference to FIG. 1, on applying a voltage across the anode 102 and cathode 106, protons will form at the anode from oxidation of hydrogen gas supplied to the anode, while hydroxide ions and hydrogen gas will form at the cathode electrolyte from the reduction of water, as follows:

$H_2 = 2H^+ + 2e^-$ (anode, oxidation reaction)

$2H_2O + 2e^- = H_2 + 2OH^-$ (cathode, reduction reaction)

Since protons are formed at the anode from hydrogen gas provided to the anode, and since a gas such as oxygen does not form at the anode; and since water in the cathode electrolyte forms hydroxide ions and hydrogen gas at the cathode, the system will produce hydroxide ions in the cathode electrolyte and protons in the anode electrolyte when a voltage is applied across the anode and cathode. Further, as can be appreciated, in the present system since a gas does not form at the anode, the system will produce hydroxide ions in the cathode electrolyte and hydrogen gas at the cathode and hydrogen ions at the anode when less than 2V is applied across the anode and cathode, in contrast to the higher voltage that is required when a gas is generated at the anode, e.g., chlorine or oxygen. For example, in various embodiments, hydroxide ions are produced when less than 2.0V, 1.5V, 1.4V, 1.3V, 1.2V, 1.1V, 1.0V, 0.9V, 0.8V, 0.7V, 0.6V, 0.5V, 0.4V, 0.3V, 0.2V, 0.1 V or less is applied across the anode and cathode.

As discussed above, in the system, on applying a voltage across the anode 102 and cathode 106, the positively charged protons formed at the anode will attempt to migrate to the cathode through the anode electrolyte 104, while the negatively charged hydroxide ions formed at the cathode will attempt to migrate to the anode through the cathode electrolyte 108, 108A, 108B. As is illustrated in FIG. 1 and with reference to hydroxide ions in the cathode electrolyte 108, 108A, 108B, since the first cation exchange membrane 116 will restrict the migration of anions from the cathode electrolyte 108, 108A, 108B, and since the anion exchange membrane 120 will prevent the migration of anions from the anode electrolyte 104 to the salt solution 118, the hydroxide ions generated in the cathode electrolyte will be prevented from migrating out of the cathode electrolyte through the cation exchange membrane. Consequently, on applying the voltage across the anode and cathode, the hydroxide ions produced at the cathode will be contained in the cathode electrolyte. Thus, depending on the flow rate of fluids into and out of the cathode electrolyte and the rate of carbon dioxide dissolution in the cathode electrolyte, the pH of the cathode electrolyte will adjust, e.g., the pH may increase, decrease or remain the same.

In various embodiments, depending on the ionic species desired in cathode electroyte 108, 108A, 108B and/or the anode electolyte 104 and/or the salt solution 118, alternative reactants can be utilized. Thus, for example, if a potassium salt such as potassium hydroxide or potassium carbonate is desired in the cathode electolyte 1108, 108A, 108B, then a potassium salt such as potassium chloride can be utilized in the salt solution 118. Similarly, if sulfuric acid is desired in the anode electrolyte, then a sulfate such as sodium sulfate can be utilized in the salt solution 118. As described in various embodiments herein, carbon dioxide gas is absorbed in the cathode electrolyte; however, it will be appreciated that other gases, including volatile vapors, can be absorbed in the electrolyte, e.g., sulfur dioxide, or organic vapors to produce a desired result. As can be appreciated, the gas can be added to the electrolyte in various ways, e.g., by bubbling it directly into the electrolyte, or dissolving the gas in a separate compartment connected to the cathode compartment and then directed to the cathode electrolyte as described herein.

Figure 3:
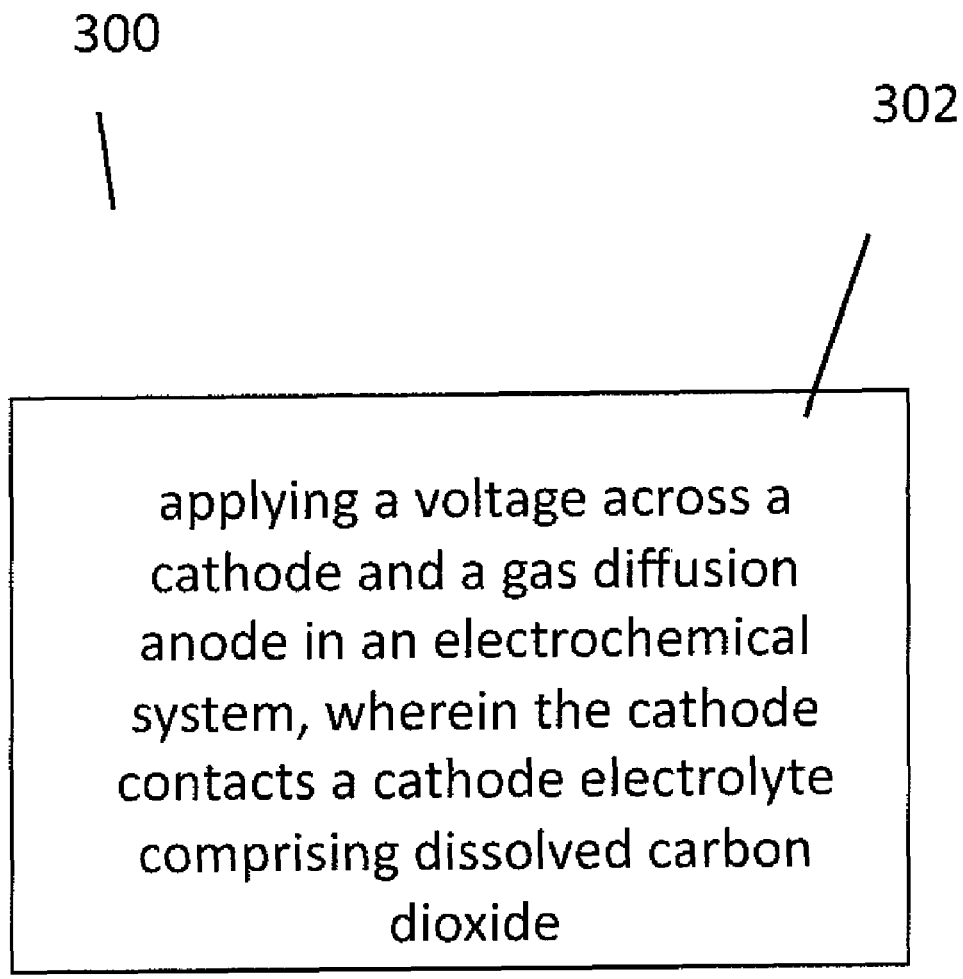
FIG. 3 is a flow chart of an embodiment of the present method.

With reference to FIGS. 1 and 3, method 300 in various embodiments comprises a step 302 of applying a voltage across a cathode 106 and a gas diffusion anode 102 in an electrochemical system 100, wherein the cathode contacts a cathode electrolyte comprising dissolved carbon dioxide. In some embodiments, the method includes a step of providing hydrogen to the gas to diffusion anode 102; a step of contacting the cathode 106 with a cathode electrolyte 108, 108A, 108B comprising dissolved carbon dioxide gas 107A; and a step of applying a voltage 114 across the anode and cathode; a step whereby protons are produced at the anode and hydroxide ions and hydrogen gas produced at the cathode; a step whereby a gas is not produced at the anode when the voltage is applied across the anode and cathode; a step wherein the voltage applied across the anode and cathode is less than 2V; a step comprising directing hydrogen gas from the cathode to the anode; a step comprising whereby protons are migrated from the anode to an anode electrolyte, a step comprising interposing an anion exchange membrane between the anode electrolyte and the salt solution; a step comprising interposing a first cation exchange membrane between the cathode electrolyte and the salt solution, wherein the salt solution is contained between the anion exchange membrane and the first cation exchange membrane; a step comprising whereby anions migrate from the salt solution to the anode electrolyte through the anion exchange membrane, and cations migrate from the salt solution to the cathode electrolyte through the first cation exchange membrane; a step comprising producing hydroxide ions and/or carbonate ions and/or bicarbonate ions in the cathode electrolyte; a step comprising producing an acid in the anode electrolyte; a step comprising producing sodium hydroxide and/or sodium carbonate and/or sodium bicarbonate in the cathode electrolyte; a step whereby hydrochloric acid is produced in the anode electrolyte; a step comprising contacting the cathode electrolyte with a divalent cation solution, wherein the divalent cations comprise calcium and magnesium ions; a step comprising producing partially desalinated water from the salt solution; a step comprising withdrawing a first portion of the cathode electrolyte and contacting the first portion of cathode electrolyte with carbon dioxide; and a step comprising contacting the first portion of cathode electrolyte with a divalent cation solution.

In various embodiments, hydroxide ions are formed at the cathode 106 and in the cathode electrolyte 108, 108A, 108B by applying a voltage of less than 2V across the anode and cathode without forming a gas at the anode, while providing hydrogen gas at the anode for oxidation at the anode. In various embodiments, method 300 does not form a gas at the anode when the voltage applied across the anode and cathode is less than 3V or less, 2.9V or less, 2.8V or less, 2.7V or less, 2.6V or less, 2.5V or less, 2.4V or less, 2.3V or less, 2.2V or less, 2.1V or less, 2.0V or less, 1.9V or less, 1.8V or less, 1.7V or less, 1.6V or less, 1.5V or less, 1.4V or less, 1.3V or less, 1.2V or less, 1.1V or less, 1.0V or less, 0.9V or less, 0.8V or less, 0.7V or less, 0.6V or less, 0.5V or less, 0.4V or less, 0.3V or less, 0.2V or less, or 0.1 V or less, while hydrogen gas is provided to the anode where it is oxidized to protons. As will be appreciated by one ordinarily skilled in the art, by not forming a gas at the anode and by providing hydrogen gas to the anode for oxidation at the anode, and by otherwise controlling the resistance in the system for example by decreasing the electrolyte path lengths and by selecting ionic membranes with low resistance and any other method know in the art, hydroxide ions can be produced in the cathode electrolyte with the present lower voltages.

In various embodiments, hydroxide ions, bicarbonate ions and carbonate ions are produced in the cathode electrolyte where the voltage applied across the anode and cathode is less than 3.0V, 2.9V, 2.8V, 2.7V, 2.6V, 2.5V, 2.4V, 2.3V, 2.2V, 2.1V, 2.0V, 1.9V, 1.8V, 1.7V, 1.6V, 1.5V, 1.4V, 1.3V, 1.2V, 1.1V, 1.0V, 0.9V, 0.8V, 0.7V, 0.6V, 0.5V, 0.4V, 0.3V, 0.2V, 0.1V or less without forming a gas at the anode. In various embodiments, the method is adapted to withdraw and replenish at least a portion of the cathode electrolyte and the acid in the anode electrolyte back into the system in either a batch, semi-batch or continuous mode of operation.

In an exemplarary embodiment, a system configured substantially as illustrated in FIGS. 1 and 2 was operated with a constant current density applied across the electrodes at steady state conditions while carbon dioxide gas was continuously dissolved into the cathode electrolyte, at various temperatures and voltages. In the system, a platinum catalyst, gas diffusion anode obtained from E-TEK Corporation, (USA) was used as the anode. A Raney nickel deposited onto a nickel gauze substrate was used as the cathode. In the system, the initial acid concentration in the anode electrolyte was 1 M; the initial sodium chloride salt solution was 5 M; and the initial concentration of the sodium hydroxide solution in the cathode compartment was 1 M. In the system, the pH of the cathode compartment was maintained at either 8 or 10 by regulating the amount of carbon dioxide dissolved in the cathode electrolyte.

TABLE 1

Experimental Current Density, Temperature and Voltage Characteristics of the System

| T (° C.) | Potential (V) | pH | Current density (mA/cm$^2$) |
|---|---|---|---|
| 25 | 0.8 | 10 | 8.6 |
|  |  | 8 | 11.2 |
|  | 1.2 | 10 | 28.3 |
|  |  | 8 | 29.2 |
|  | 1.6 | 10 | 50.2 |
|  |  | 8 | 50.6 |
| 75 | 0.8 | 10 | 13.3 |
|  |  | 8 | 17.8 |
|  | 1.2 | 10 | 45.3 |
|  |  | 8 | 49.8 |
|  | 1.6 | 10 | 80.8 |
|  |  | 8 | 84.7 |

As is illustrated in Table 1, a range of current densities was achieved across the electrode in the system. As will be appreciated by one ordinarily skilled in the art, the current density that can be achieved with other configurations of the system may vary, depending on several factors including the cumulative electrical resistance losses in the cell, environmental test conditions, the over-potential associated with the anodic and cathodic reactions, and other factors.

It will also be appreciated that the current densities achieved in the present configuration and as set forth in Table 1 are correlated with the production of hydroxide ions at the cathode, and thus are correlated with the production of sodium hydroxide and/or sodium carbonate and/or sodium bicarbonate in the cathode electrolyte, as follows. With reference to Table 1, at 75° C., 0.8 V and a pH of 10, each cm$^2$ of electrode passed 13.3 mA of current, where current is a measure of charge passed (Coulomb) per time (second) Based on Faraday's Laws, the amount of product, e.g., hydroxide ions, produced at an electrode is proportional to the total electrical charge passed through the electrode as follows:

$$n=(I*t)/(F*z)$$

where n is moles of product, I is a current, t is time, F is Faraday's constant, and z is the electrons transferred per product ionic species (or reagent ionic species). Thus, based on the present example, $1.38 \times 10^{-4}$ moles of hydroxide ions are produced per second per cm$^2$ of electrode, which is correlated with the production of sodium hydroxide in the cathode electrolyte. In the system the production rate of NaOH dictates the production rate of NaHCO$_3$ and Na$_2$CO$_3$ through Le Chatelier's principle following the net chemical equilibria equations of

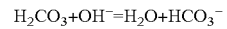

where an increase in concentration of one species in equilibria will change the concentration of all species so that the equilibrium product maintains the equilibrium constant Thus, in the system, the equilibrium concentrations of H$_2$CO$_3$, HCO$_3^-$, and CO$_3^{2-}$ vs. pH in the electrolyte will follow the carbonate speciation diagram as discussed above.

In the system as illustrated in FIG. 1 and as discussed with reference to the carbonate speciation graph, supra, the solubility of carbon dioxide in the cathode electrolyte is dependent on the pH of the electrolyte. Also in the system, the voltage across the cathode and anode is dependent on several factors including the pH difference between the anode electrolyte and cathode electrolyte. Thus, in some embodiments the system can be configured to operate at a specified pH and voltage to absorb carbon dioxide and produce carbonic acid, carbonate ions and/or bicarbonate ions in the cathode electrolyte. In embodiments where carbon dioxide gas is dissolved in the cathode electrolyte, as protons are removed from the cathode electrolyte more carbon dioxide may be dissolved to form carbonic acid, bicarbonate ions and/or carbonate ions. Depending on the pH of the cathode electrolyte the balance is shifted toward bicarbonate ions or toward carbonate ions, as is well understood in the art and as is illustrated in the carbonate speciation diagram, above. In these embodiments the pH of the cathode electrolyte solution may decrease, remain the same, or increase, depending on the rate of removal of protons compared to rate of introduction of carbon dioxide. It will be appreciated that no carbonic acid, hydroxide ions, carbonate ions or bicarbonate ions are formed in these embodiments, or that carbonic acid, hydroxide ions, carbonate ions, bicarbonate ions may not form during one period but form during another period.

In another embodiment, the present system and method are integrated with a carbonate and/or bicarbonate precipitation system (not illustrated) wherein a solution of divalent cations, when added to the present cathode electrolyte, causes formation of precipitates of divalent carbonate and/or bicarbonate compounds, e.g., calcium carbonate or magnesium carbonate and/or their bicarbonates. In various embodiments, the precipitated divalent carbonate and/or bicarbonate compounds may be utilized as building materials, e.g., cements and aggregates as described for example in commonly assigned U.S. patent application Ser. No. 12/126,776 filed on May 23, 2008, herein incorporated by reference in its entirety.

In an alternative embodiment, the present system and method are integrated with a mineral and/or material dissolution and recovery system (not illustrated) wherein the acidic anode electrolyte solution 104 or the basic cathode electrolyte 108 is utilized to dissolve calcium and/or magnesium-rich minerals e.g., serpentine or olivine, or waste materials, e.g., fly ash, red mud and the like, to form divalent cation solutions that may be utilized, e.g., to precipitate carbonates and/or bicarbonates as described herein. In various embodiments, the precipitated divalent carbonate and/or bicarbonate compounds may be utilized as building materials, e.g., cements and aggregates as described for example in commonly assigned U.S. patent application Ser. No. 12/126,776 filed on May 23, 2008, herein incorporated by reference in its entirety.

In an alternative embodiment, the present system and method are integrated with an industrial waste gas treatment system (not illustrated) for sequestering carbon dioxide and other constituents of industrial waste gases, e.g., sulfur gases, nitrogen oxide gases, metal and particulates, wherein by contacting the flue gas with a solution comprising divalent cations and the present cathode electrolyte comprising hydroxide, bicarbonate and/or carbonate ions, divalent cation carbonates and/or bicarbonates are precipitated as described in commonly assigned U.S. patent application Ser. No. 12/344,019 filed on Dec. 24, 2008, herein incorporated by reference in its entirety. The precipitates, comprising, e.g., calcium and/or magnesium carbonates and bicarbonates in various embodiments may be utilized as building materials, e.g., as cements and aggregates, as described in commonly assigned U.S. patent application Ser. No. 12/126,776 filed on May 23, 2008, herein incorporated by reference in its entirety.

In another embodiment, the present system and method are integrated with an aqueous desalination system (not illustrated) wherein the partially desalinated water of the third electrolyte of the present system is used as feed-water for the desalination system, as described in commonly assigned U.S. patent application Ser. No. 12/163,205 filed on Jun. 27, 2008, herein incorporated by reference in its entirety.

In an alternative embodiment, the present system and method are integrated with a carbonate and/or bicarbonate solution disposal system (not illustrated) wherein, rather than producing precipitates by contacting a solution of divalent cations with the first electrolyte solution to form precipitates, the system produces a solution, slurry or suspension comprising carbonates and/or bicarbonates. In various embodiments, the solution, slurry or suspension is disposed of in a location where it is held stable for an extended periods of time, e.g., the solution/slurry/suspension is disposed in an ocean at a depth where the temperature and pressure are sufficient to keep the slurry stable indefinitely, as described in U.S. patent application Ser. No. 12/344,019 filed on Dec. 24, 2008, herein incorporated by reference in its entirety; or in a subterranean site.

The invention claimed is:

1. An electrochemical system comprising:
a gas diffusion anode contacting an anode electrolyte wherein the anode is configured to produce protons from hydrogen gas;
a cathode contacting a cathode electrolyte comprising dissolved carbon dioxide and gaseous carbon dioxide, wherein the carbon dioxide is obtained from sources comprising combustion gas of fossil fuelled electrical power generating plant, cement plant, ore processing plant, or combination thereof; and
a gas delivery system configured to deliver hydrogen gas produced at the cathode to the anode;
wherein the system is configured to not produce a gas at the anode and wherein the system is configured to produce an acid in the anode electrolyte on application of a voltage across the anode and cathode.

2. The system of claim 1, wherein the cathode is configured to produce hydroxide ions.

3. The system of claim 1, wherein the voltage is less than 2V.

4. The system of claim 1, wherein the system is configured to produce sodium hydroxide and/or sodium bicarbonate and/or sodium carbonate in the cathode electrolyte.

5. The system of claim 1, further comprising a partition that partitions the cathode electrolyte into a first cathode electrolyte portion and a second cathode electrolyte portion, wherein the second cathode electrolyte portion contacts the cathode and comprises dissolved carbon dioxide.

6. The system of claim 5, wherein the first cathode electrolyte portion comprises dissolved carbon dioxide and gaseous carbon dioxide.

7. The system of claim 6, wherein the partition is positioned to isolate gaseous carbon dioxide gas in the first cathode electrolyte portion from cathode electrolyte in the second cathode electrolyte portion.

8. The system of claim 7, comprising sodium hydroxide and/or sodium carbonate and/or sodium bicarbonate in the cathode electrolyte.

9. The system of claim 1, further comprising a carbon dioxide gas/liquid contactor configured to dissolve carbon dioxide in the cathode electrolyte.

10. The system of claim 9, further comprising a system configured to produce carbonates and/or bicarbonates and/or hydroxides by contacting the cathode electrolyte comprising carbon dioxide with divalent cations.

11. The system of claim 1, further comprising a carbon dioxide sequestration system operatively connected to receive the cathode electrolyte and mix the cathode electrolyte with divalent cations to precipitate a hydroxide, carbonate and/or bicarbonate.

12. The system of claim 11, wherein the precipitate comprises calcium hydroxide, magnesium hydroxide, calcium carbonate, magnesium carbonate, calcium bicarbonate, and/or magnesium bicarbonate.

13. The system of claim 1, further comprising a mineral dissolution system operatively connected to the anode electrolyte wherein the mineral dissolution system comprises means for dissolving a mineral with the acid in the anode electrolyte.

14. The system of claim 1, further comprising a desalination system operatively connected to the electrochemical system and configured to produce desalinated water from the anode electrolyte and/or cathode electrolyte.

15. An electrochemical method comprising:
contacting an anode electrolyte with a gas diffusion anode;
contacting a cathode electrolyte with a cathode, wherein the cathode electrolyte comprises dissolved carbon dioxide and gaseous carbon dioxide;
dissolving the gaseous carbon dioxide into the cathode electrolyte wherein the carbon dioxide is obtained from sources comprising combustion gas of fossil fuelled electrical power generating plant, cement plant, ore processing plant, or combination thereof;
separating the anode electrolye from the cathode electrolyte using an ion exchange membrane;
applying a voltage across the gas diffusion anode and the cathode;
producing hydrogen gas at the cathode and directing the hydrogen gas to the gas diffusion anode;
oxidizing the hydrogen gas to protons at the anode without producing a gas at the anode; and
producing an acid in the anode electrolyte.

16. The method of claim 15, wherein the voltage is less than 2V.

17. The method of claim 15, further comprising producing hydroxide ions and/or carbonate ions and/or bicarbonate ions in the cathode electrolyte.

18. The method of claim 15, further comprising partitioning the cathode electrolyte into a first cathode electrolyte portion and a second cathode electrolyte portion, wherein the second cathode electrolyte portion contacts the cathode and comprises dissolved carbon dioxide and is devoid of gaseous carbon dioxide, and wherein the first cathode electrolyte portion comprises gaseous carbon dioxide.

19. The method of claim 18, wherein the partition is positioned to isolate the gaseous carbon dioxide in the first cathode electrolyte portion from the cathode electrolyte in the second cathode electrolyte portion such that the first cathode electrolyte portion contacts the gaseous carbon dioxide and the second cathode electrolyte portion is devoid of the gaseous carbon dioxide.

20. The method of claim 15, comprising
dissolving the gaseous carbon dioxide into the cathode electrolyte through a gas/liquid contactor;
contacting the cathode electrolyte with a divalent cation solution comprising calcium and/or magnesium ions; and
precipitating calcium and/or magnesium carbonate and/or bicarbonate from the cathode electrolyte.

21. The method of claim 15, further comprising connecting the anode electrolyte to a mineral dissolution system and dissolving the mineral with acid to produce a divalent cation solution.

\* \* \* \* \*